(12) United States Patent
Kimura

(10) Patent No.: US 12,504,853 B2
(45) Date of Patent: Dec. 23, 2025

(54) INFORMATION PROCESSING APPARATUS, INFORMATION PROCESSING METHOD, AND NON-TRANSITORY COMPUTER READABLE MEDIUM RESPONDING TO OBJECT PERFORMING CONTACTLESS OPERATION

(71) Applicant: FUJIFILM BUSINESS INNOVATION CORP., Tokyo (JP)

(72) Inventor: Hosana Kimura, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 506 days.

(21) Appl. No.: 17/869,136

(22) Filed: Jul. 20, 2022

(65) Prior Publication Data

US 2023/0229267 A1 Jul. 20, 2023

(30) Foreign Application Priority Data

Jan. 18, 2022 (JP) .................................. 2022-005636

(51) Int. Cl.
*G06F 3/044* (2006.01)
*G06F 3/14* (2006.01)

(52) U.S. Cl.
CPC ................ *G06F 3/044* (2013.01); *G06F 3/14* (2013.01); *G06F 2203/04108* (2013.01)

(58) Field of Classification Search
CPC .. G06F 3/044; G06F 3/14; G06F 2203/04108; G06F 2203/04101
See application file for complete search history.

(56) References Cited

U.S. PATENT DOCUMENTS

| | | | | |
|---|---|---|---|---|
| 7,786,980 B2* | 8/2010 | Lashina | ............... | G06F 3/04883 345/173 |
| 8,446,383 B2* | 5/2013 | Miyazawa | .......... | G06F 3/04886 345/173 |

(Continued)

FOREIGN PATENT DOCUMENTS

| EP | | 2720120 A4 * | 12/2014 | ......... G01R 27/2605 |
|---|---|---|---|---|
| JP | | 2008-505381 A | 2/2008 | |

(Continued)

OTHER PUBLICATIONS

Aug. 19, 2025 Office Action issued in Japanese Patent Application No. 2022-005636.

*Primary Examiner* — David D Davis
(74) *Attorney, Agent, or Firm* — Oliff PLC

(57) ABSTRACT

An information processing apparatus includes a processor configured to: cause a first frame to be displayed, in response to detection of an object performing contactless operation over a screen, in accordance with a distance between the screen and the object, the first frame being centered on a position on the screen corresponding to a position of the detected object; and cause multiple second frames to be displayed in association with multiple regions, the multiple second frames being centered on the position on the screen corresponding to the position of the detected object and having a different display form from the first frame, the multiple regions being defined in accordance with a distance from the screen and being assigned in advance different operations to be performed in response to the contactless operation.

20 Claims, 21 Drawing Sheets

(56) References Cited

U.S. PATENT DOCUMENTS

| | | | | |
|---|---|---|---|---|
| 8,576,181 B2* | 11/2013 | Cho | ............ | G06F 3/0393 |
| | | | | 345/173 |
| 2011/0157078 A1* | 6/2011 | Miyazawa | ............ | G06F 3/0446 |
| | | | | 345/174 |
| 2014/0225860 A1* | 8/2014 | Aono | ............ | G06F 3/04883 |
| | | | | 345/174 |
| 2015/0067594 A1* | 3/2015 | Choi | ............ | G06F 3/0488 |
| | | | | 715/808 |
| 2016/0092062 A1* | 3/2016 | Miyagi | ............ | G06F 3/017 |
| | | | | 345/173 |
| 2023/0229267 A1* | 7/2023 | Kimura | ............ | G06F 3/14 |
| | | | | 345/174 |

FOREIGN PATENT DOCUMENTS

| | | |
|---|---|---|
| JP | 2014-219938 A | 11/2014 |
| JP | 2016-146104 A | 8/2016 |
| JP | 2017-215866 A | 12/2017 |
| JP | 2019-046458 A | 3/2019 |
| WO | 2017-034020 A1 | 3/2017 |

* cited by examiner

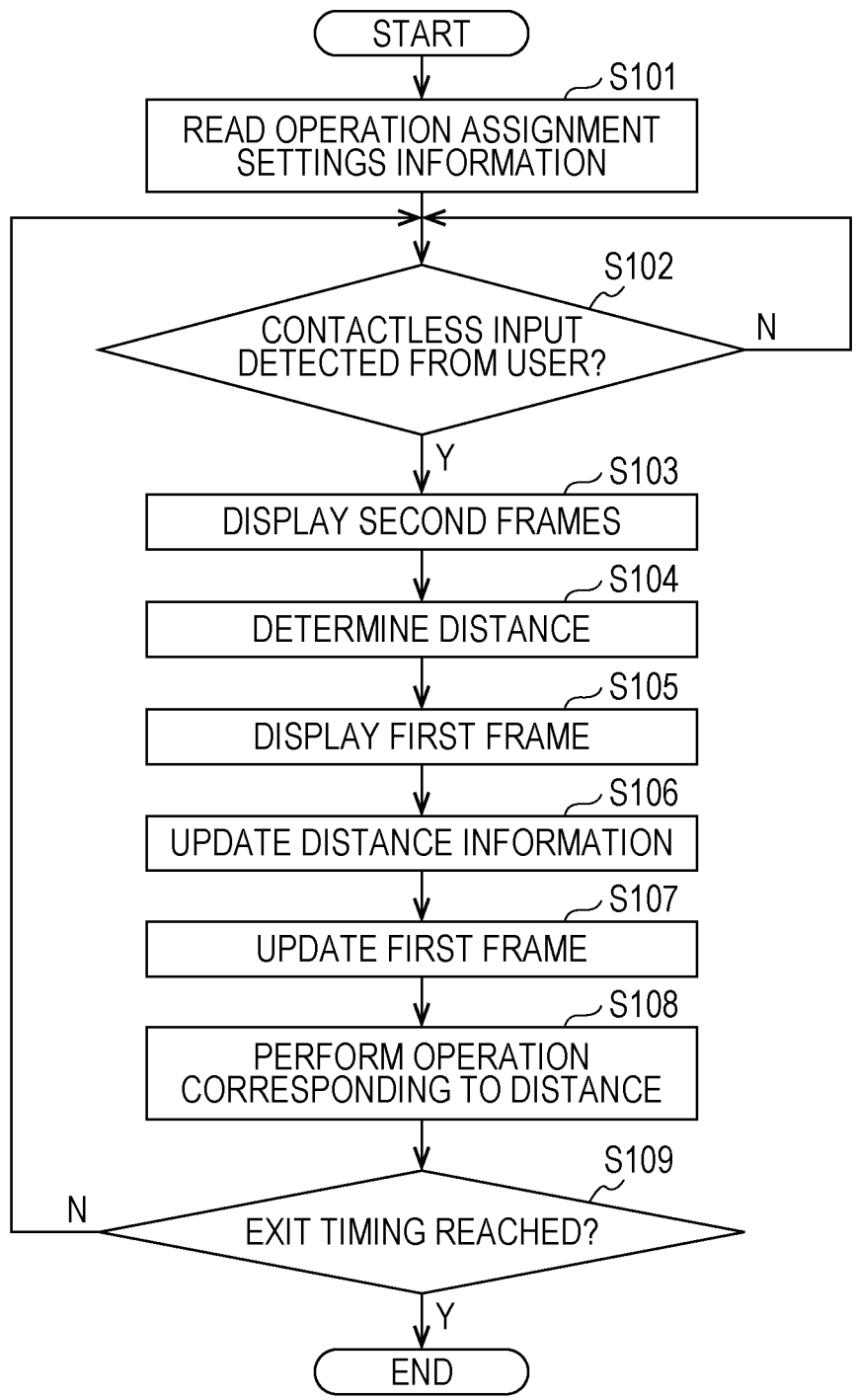

FIG. 22
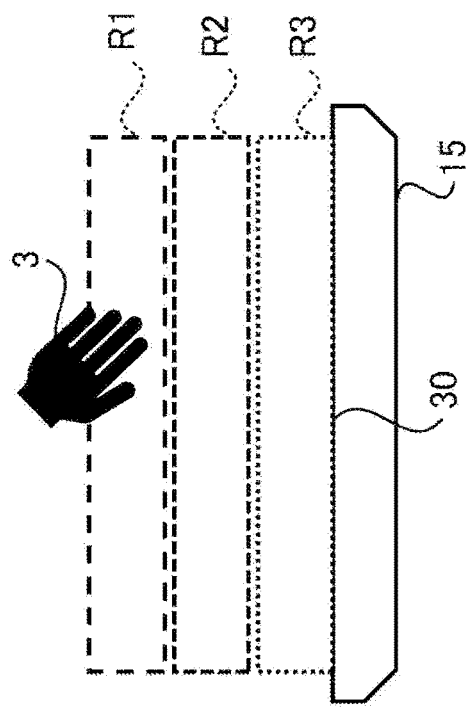
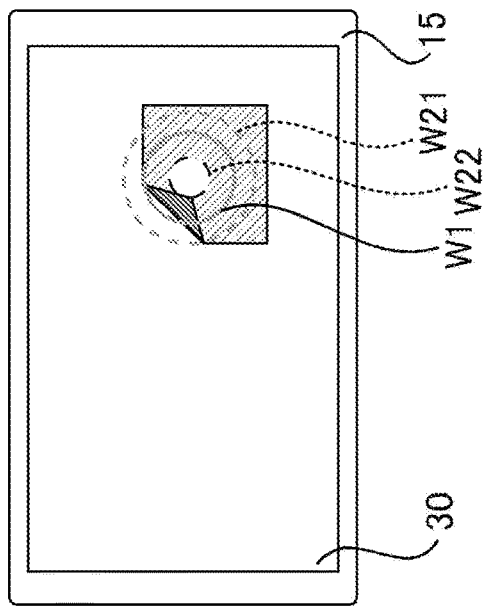
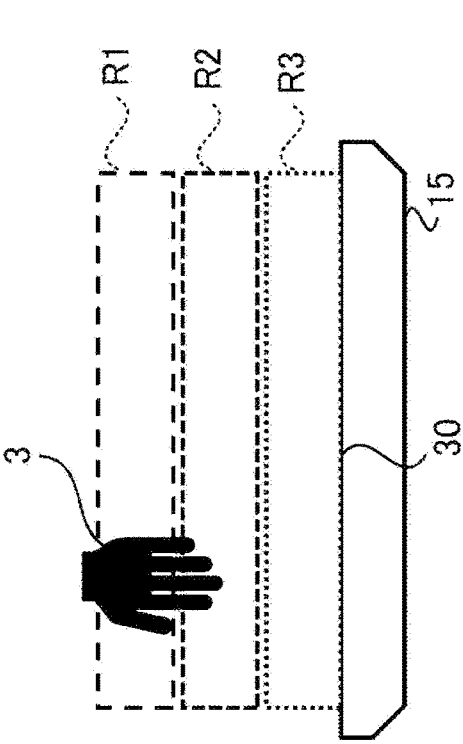
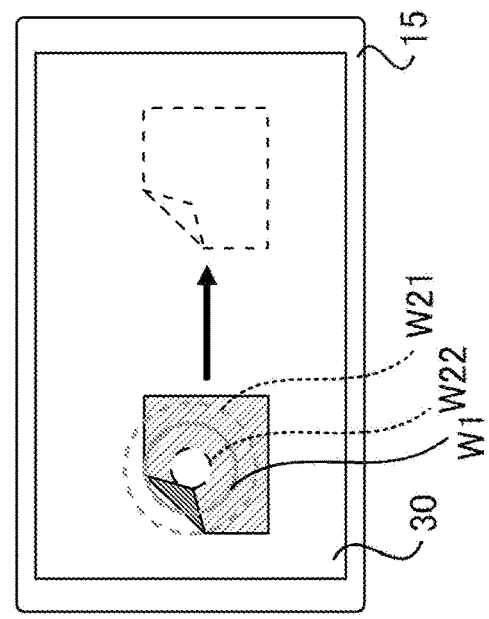

INFORMATION PROCESSING APPARATUS, INFORMATION PROCESSING METHOD, AND NON-TRANSITORY COMPUTER READABLE MEDIUM RESPONDING TO OBJECT PERFORMING CONTACTLESS OPERATION

CROSS-REFERENCE TO RELATED APPLICATIONS

This application is based on and claims priority under 35 USC 119 from Japanese Patent Application No. 2022-005636 filed Jan. 18, 2022.

BACKGROUND

(i) Technical Field

The present disclosure relates to an information processing apparatus, an information processing method, and a non-transitory computer readable medium.

(ii) Related Art

For example, Japanese Unexamined Patent Application Publication (Translation of PCT Application) No. 2008-505381 describes a method for preventing staining of a display screen by a user's fingers. The method includes the steps of determining a first threshold distance from the display screen within which a user's finger is to be detected; and determining a second threshold distance from the display screen within which the user's finger is to be detected, the second threshold distance being shorter than the first threshold distance. The method further includes a first detection step of detecting that the user's finger is within the first threshold distance; and a first indication step of indicating to the user, upon a detection in the first detection step, that the user's finger has entered a zone proximate to the screen where interaction with a graphical user interface (GUI) is enabled, the GUI enabling manipulating various display functions by movements of the user's finger. The method further includes a second detection step of detecting that the user's finger is within the second threshold distance; and a second indication step of indicating to the user, upon a detection in the second detection step, that the user's finger has entered a forbidden zone.

Japanese Unexamined Patent Application Publication No. 2014-219938 describes an input support apparatus that provides feedback to a user when the user performs an operation in a contactless manner without using a controller. The input support apparatus includes space coordinates acquiring means for continuously acquiring space coordinates of a certain part of the user via a detector; and display control means for, based on the space coordinates updated by the space coordinates acquiring means, performs display control to move a marker to a corresponding position on a display screen of a display unit. An initial shape of the marker includes a plurality of shapes obtained by dividing any desired shape. The display control means separates the shapes more widely from each other starting from the corresponding position on the display screen as a distance of the space coordinates to a certain plane in a coordinate system of the space coordinates is longer, and brings the shapes closer to each other toward the corresponding position on the display screen as the distance is shorter.

SUMMARY

Techniques allow users to operate screens in a contactless manner. In such a contactless operation, upon a user holding an object such as their hand or finger(s) over a screen, the position of the object is detected and an operation (function) corresponding to the detected position is performed.

The operation may be determined by the difference in distance from the screen. The contactless operation, which is performed in the air without touching the screen, makes it difficult for the user to visually grasp the distance from the screen and also grasp the content of the operation corresponding to the distance.

Aspects of non-limiting embodiments of the present disclosure relate to an information processing apparatus, an information processing method, and a non-transitory computer readable medium that enable a user who operates a screen in a contactless manner to visually grasp the correspondence between a distance from the screen and an operation that differs depending on the distance.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including a processor configured to: cause a first frame to be displayed, in response to detection of an object performing contactless operation over a screen, in accordance with a distance between the screen and the object, the first frame being centered on a position on the screen corresponding to a position of the detected object; and cause a plurality of second frames to be displayed in association with a plurality of regions, the plurality of second frames being centered on the position on the screen corresponding to the position of the detected object and having a different display form from the first frame, the plurality of regions being defined in accordance with a distance from the screen and being assigned in advance different operations to be performed in response to the contactless operation.

BRIEF DESCRIPTION OF THE DRAWINGS

Exemplary embodiments of the present disclosure will be described in detail based on the following figures, wherein:

FIG. 18 is a flowchart illustrating an example of a process based on an information processing program according to the first exemplary embodiment;

FIG. 22 is a diagram illustrating an example of a screen transition in response to a movement of the user's hand according to the second exemplary embodiment.

DETAILED DESCRIPTION

The following describes exemplary embodiments of the present disclosure in detail with reference to the drawings. Components and processes that have substantially the same operations and functions are assigned the same reference symbols throughout the drawings, and redundant descriptions thereof may be omitted. The drawings are merely presented in schematic form sufficient to provide a full understanding of the present disclosure. Therefore, the present disclosure is not limited to only the illustrated examples. In the exemplary embodiments, descriptions of configurations that are not directly related to the present disclosure or are well known may be omitted.

First Exemplary Embodiment

Figure 1:
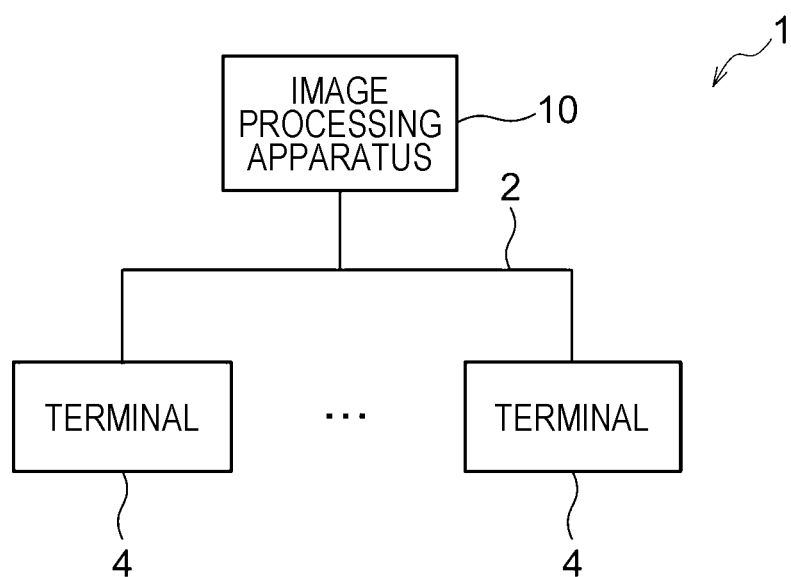
FIG. 1 is a diagram illustrating an example configuration of an information processing system including an information processing apparatus having a contactless user interface through which a user performs an operation in a contactless manner.

FIG. 1 is a diagram illustrating an example configuration of an information processing system 1 including an information processing apparatus. The information processing apparatus has a contactless user interface through which a user performs an operation in a contactless manner.

The information processing apparatus in the information processing system 1 may be applied to any field as long as the information processing apparatus includes a contactless user interface. Examples of the information processing apparatus include an image processing apparatus, an automatic teller machine (ATM), a vending machine, and an automatic ticket dispenser. The information processing apparatus may be for personal use only or usable by an unspecified number of users.

An example of the information processing apparatus, namely, an image processing apparatus 10 installed in a workplace, will be described hereinafter with reference to FIGS. 1 and 2.

Figure 2:
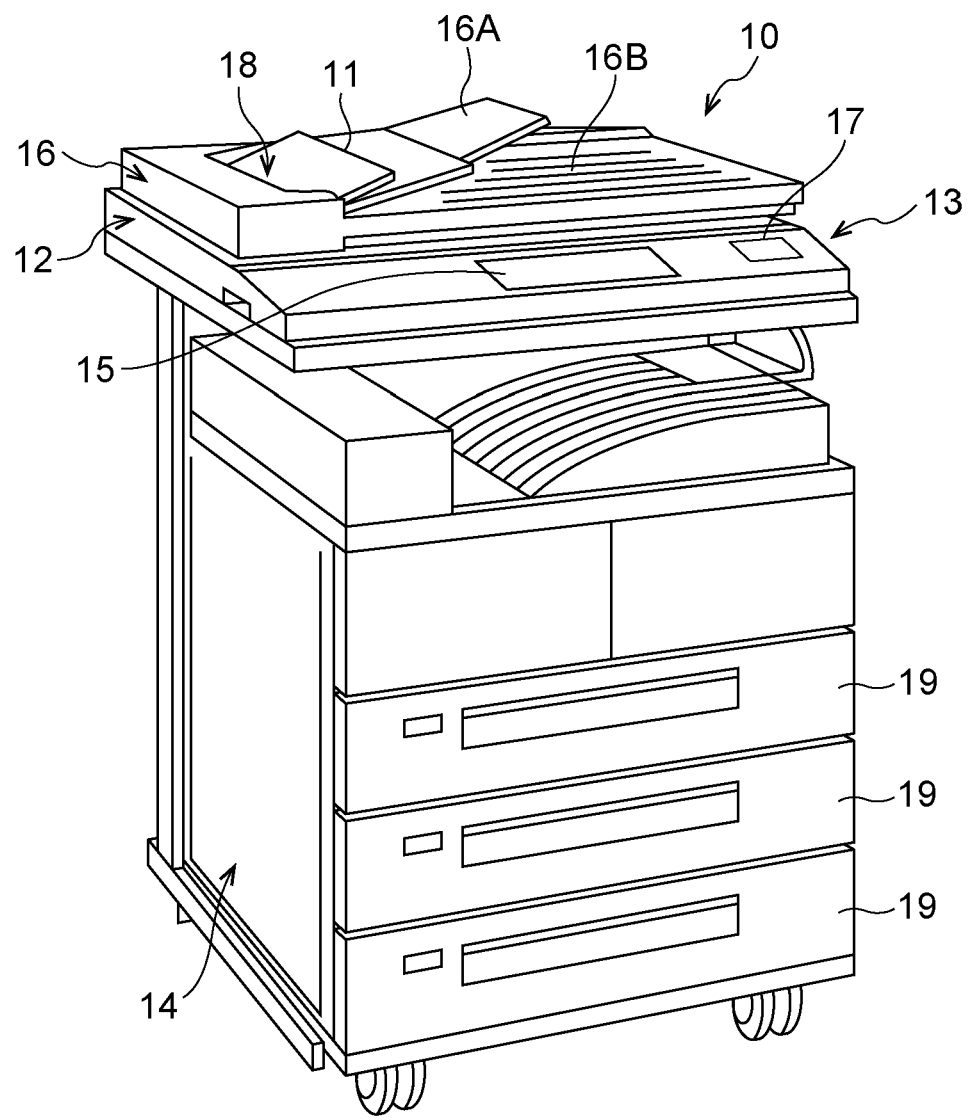
FIG. 2 is a perspective view of a substantial part of an image processing apparatus according to exemplary embodiments.

FIG. 2 is a perspective view of a substantial part of the image processing apparatus 10 according to this exemplary embodiment.

As described below, the image processing apparatus 10 is configured to execute functions related to images in accordance with instructions from users. The image processing apparatus 10 is connected to, for example, a plurality of terminals 4 via a communication line 2. Each of the plurality of terminals 4 is used by each individual user.

Each user transmits image data generated by a corresponding one of the terminals 4 to the image processing apparatus 10 through the communication line 2 to cause the image processing apparatus 10 to execute desired image processing. Alternatively, the user may bring a portable storage medium such as a Universal Serial Bus (USB) memory or a memory card storing image data to the image processing apparatus 10 and connect the portable storage medium to the image processing apparatus 10 to cause the image processing apparatus 10 to execute desired image processing. Alternatively, the user may bring a document having at least one of text or an image to the image processing apparatus 10 and make the image processing apparatus 10 read the document to cause the image processing apparatus 10 to execute desired image processing.

The communication line 2 may be of any type that provides a connection between the image processing apparatus 10 and the terminals 4, such as a wired connection, a wireless connection, or a combination of wired and wireless connections. In addition, any number of terminals 4 may be connected to the image processing apparatus 10. For example, none of the terminals 4 may be connected to the image processing apparatus 10.

The terminals 4 are information devices configured to be used by users. The terminals 4 may be any type of information device having a data storage function and a data communication function. The terminals 4 include, for example, computers intended to be used at fixed positions, and mobile terminals intended to be transported and used, such as smartphones and wearable devices.

As illustrated in FIG. 2, the image processing apparatus 10 has, for example, a scan function for reading an image on a recording medium such as paper as image data, a print function for forming an image represented by image data on a recording medium, and a copy function for forming the same image as an image formed on a recording medium onto another recording medium. The copy function, the print function, and the scan function are examples of image processing to be performed by the image processing apparatus 10.

The image processing apparatus 10 illustrated in FIG. 2 includes, for example, a document reading unit 12 and an image forming unit 14. The document reading unit 12 is located in an upper portion of the image processing apparatus 10, and the image forming unit 14 is located below the document reading unit 12.

The document reading unit 12 includes an optical reading device (not illustrated) and a document transport device 18. The document transport device 18 is disposed in a document cover 16. The document cover 16 is provided with a document table 16A, on which documents 11 are placed. The document transport device 18 sequentially feeds each of the documents 11 on the document table 16A and transports the document 11 onto a transported-document scanning glass (not illustrated). The document reading unit 12 reads the content of the document 11 transported onto the transported-document scanning glass (not illustrated) as image data using the optical reading device (not illustrated). Thereafter, the document transport device 18 discharges the document 11 whose content has been read onto a discharge table 16B included in the document cover 16.

The image forming unit 14 forms an image represented by image data on a recording medium. Recording media are stored in storage trays 19 that are classified by the type or size of recording media. The image forming unit 14 may form an image in any color on a recording medium and may form a color image or a monochrome image.

The image processing apparatus 10 includes, in a front portion thereof, an operation display unit 13 that accepts operations for executing various functions such as the copy function, the print function, and the scan function from a user.

Specifically, the operation display unit 13 includes a reader device 17 that acquires information on a user who performs an operation, and an operation panel 15 that accepts an operation performed by the user.

For example, in response to the user bringing their employee identity card close to the reader device 17, the reader device 17 reads identification information that uniquely identifies the user from an integrated circuit (IC) chip incorporated in the employee identity card in a contactless manner. The identification information is referred to as a "user ID".

The operation panel 15 is a display having a touch panel superimposed thereon. The operation panel 15 displays icon images. Each of the icon images represents an item to be operated by the user to execute a desired function. The types of the icon images are not limited as long as the icon images are to be operated by the user. The icon images include, for example, a button, a scroll bar, a check box, and a radio button. In response to the user performing an operation on one of the icon images, the image processing apparatus 10 executes a process associated in advance with the content of the operation, and a response to the operation is displayed on the operation panel 15.

Figure 3A:
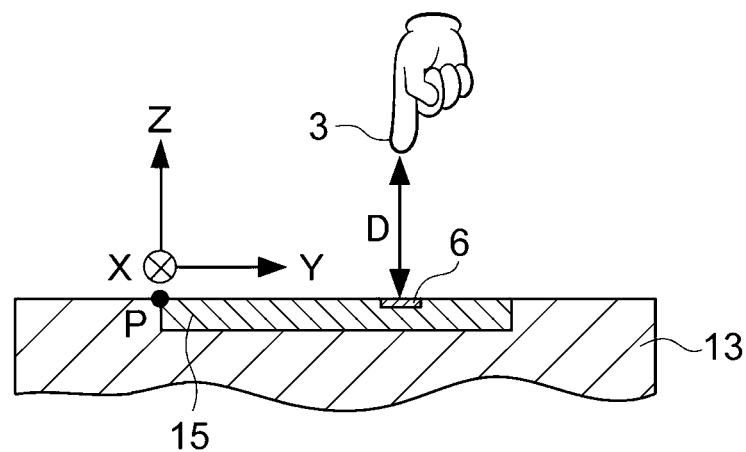
FIG. 3A is a sectional view of an operation panel according to the exemplary embodiments.
Figure 3B:
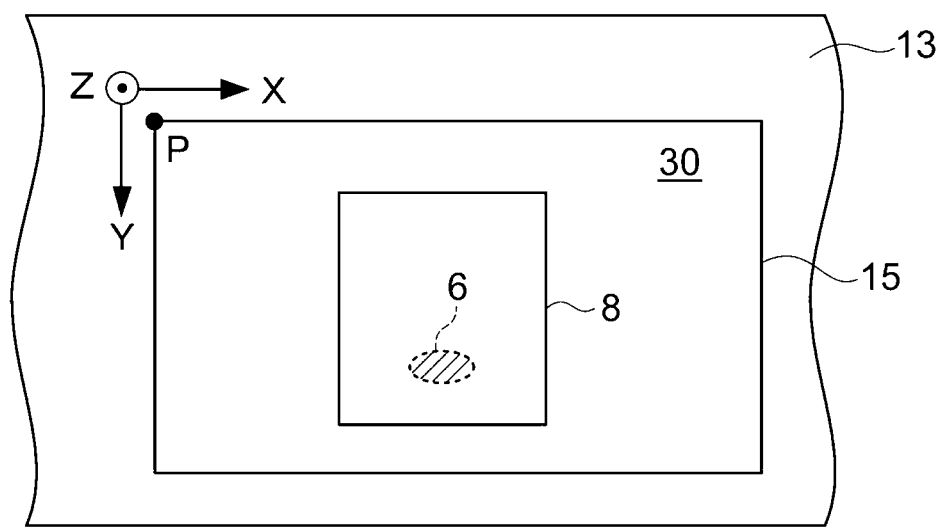
FIG. 3B is a plan view of the operation panel when viewed in a direction facing a display surface of the operation panel.

FIGS. 3A and 3B illustrate an example of the operation panel 15 that allows detection of an operation position 6 of the user in a contactless manner. FIG. 3A is a sectional view of the operation panel 15, and FIG. 3B is a plan view of the operation panel 15 when viewed in a direction facing a display surface of the operation panel 15.

The operation panel 15 detects the position of the user's finger, that is, the operation position 6, in a contactless manner. The phrase "detecting the operation position 6 in a contactless manner" refers to detecting the position of the user's finger in response to the user holding the finger over a location that is in a space above the display surface of the operation panel 15 and that does not come in contact with the display surface of the operation panel 15 within a range of the display surface of the operation panel 15 without pressing the finger against the display surface of the operation panel 15. The space above the display surface of the operation panel 15 within the range of the display surface of the operation panel 15 is hereinafter referred to as a space "over the operation panel 15" or "above the operation panel 15". The phrase "holding the user's finger over something (such as the operation panel 15)" means that the user points at a space over the operation panel 15 with their finger without touching the display surface of the operation panel 15.

The operation panel 15 includes a so-called capacitive touch panel that detects the operation position 6 from a change in electrostatic capacitance caused by the user holding their finger over the operation panel 15. In the operation panel 15 including such a touch panel, a change in electrostatic capacitance at a position closest to the user's finger is larger than a change in electrostatic capacitance at any other position. Accordingly, the operation panel 15 outputs, as the operation position 6 of the user, a portion with the largest change in electrostatic capacitance within the range of the operation panel 15.

To identify the operation position 6 of the user on the operation panel 15, an operation coordinate system is defined for the operation panel 15 to define a detection area for contactless detection of the position of the user's finger. The operation coordinate system is represented as a three-dimensional coordinate system having any position on the operation panel 15 as an origin P. In the example of the operation panel 15 illustrated in FIGS. 3A and 3B, the origin P is set at one of the vertices of the outline of the rectangular operation panel 15. In the example of the operation panel 15 illustrated in FIGS. 3A and 3B, furthermore, an X axis is set along a lateral direction of the operation panel 15 with respect to the origin P, a Y axis is set along a longitudinal direction of the operation panel 15 with respect to the origin P, and a Z axis is set so as to be perpendicular to the X and Y axes. The Z-axis direction is referred to as a height direction of the operation panel 15.

The operation position 6 of the user on the operation panel 15 is represented by a coordinate point (x, y), which is a combination of the coordinate value x of the X coordinate and the coordinate value y of the Y coordinate of a position where the change in electrostatic capacitance is largest within the range of the operation panel 15.

When the operation panel 15 displays icon images, an icon image displayed so as to include the operation position 6 of the user is recognized as the icon image being operated by the user. In the example of the operation panel 15 illustrated in FIG. 3B, the operation position 6 of the user is included in the area of a button 8 arranged in a screen 30 displayed on the operation panel 15. Thus, the user is recognized as operating the button 8. An icon image displayed so as to include the operation position 6 of the user may be hereinafter referred to as an "icon image corresponding to the operation position 6". The operation position 6 is an example of a "detected position at which the operation performed by the user has been detected" according to this exemplary embodiment.

As illustrated in FIG. 3A, the length of a perpendicular drawn from a hand 3 of the user, which is held over the operation panel 15, to the display surface of the operation panel 15, that is, the distance from the hand 3 of the user to the operation panel 15 in the height direction of the operation panel 15, is represented by an "operation distance D". The hand 3 of the user is an example of an object with which the user performs operations. The object may be a body part of the user, other than the user's hand or fingers, or may be a stylus or other object owned by the user. As the operation distance D decreases, the change in electrostatic capacitance at the operation position 6 of the user increases on the operation panel 15. Conversely, as the operation distance D increases, the change in electrostatic capacitance at the operation position 6 of the user decreases on the operation panel 15. Accordingly, associating the operation distance D with the amount of change in electrostatic capacitance in advance makes it possible to obtain the operation distance D from the amount of change in electrostatic capacitance on the operation panel 15.

Based on the correspondence relationship between the operation distance D and the amount of change in electrostatic capacitance, the operation panel 15 recognizes the operation position 6 of the user not only as a two-dimensional operation position 6 along the display surface of the operation panel 15 but also as a three-dimensional operation position 6 that takes the operation distance D into account. That is, when the operation position 6 of the user is represented as a three-dimensional position, the operation position 6 of the user is represented by a coordinate point (x, y, z) obtained by combining a coordinate value z representing the operation position 6 in the height direction of the operation panel 15 with the coordinate point (x, y). The coordinate value z is a coordinate value, on the Z axis, of a position the operation distance D away from the origin P along the Z axis.

The coordinate value z=0 means that the user is performing an operation while touching the display surface of the operation panel 15 with their finger. Accordingly, the image processing apparatus 10 also recognizes a difference in the manner of the operation of the user, such as whether the user is operating the operation panel 15 in a contactless manner or operating the operation panel 15 with their finger touching the operation panel 15. As described above, the operation panel 15 supports both a contact operation in which the user performs an operation while touching the display surface of the operation panel 15 with their finger and a contactless operation in which the user operates the operation panel 15 while holding their finger over the operation panel 15.

As described above, since the change in electrostatic capacitance at the operation position 6 of the user decreases on the operation panel 15 as the operation distance D increases, the operation distance D has an upper limit. If the user holds their finger over the operation panel 15 at a position exceeding the upper limit of the operation distance D, the electrostatic capacitance at the operation position 6 of the user does not change, and the operation panel 15 makes no response to the operation of the user.

A detection area for icon images is a spatial region that is located about 3 cm above and away from the operation panel 15, for example. In other words, in response to the user moving the hand 3 close to a position about 3 cm above and away from the operation panel 15, the electrostatic capacitance in the corresponding icon image changes and a contactless input is detected. The XYZ coordinates of the position of the hand 3 in the detection area are acquired as those of the operation position 6. In response to the user further moving the hand 3 to a position closer than 3 cm, the XYZ coordinates of the position are acquired.

Figure 4:
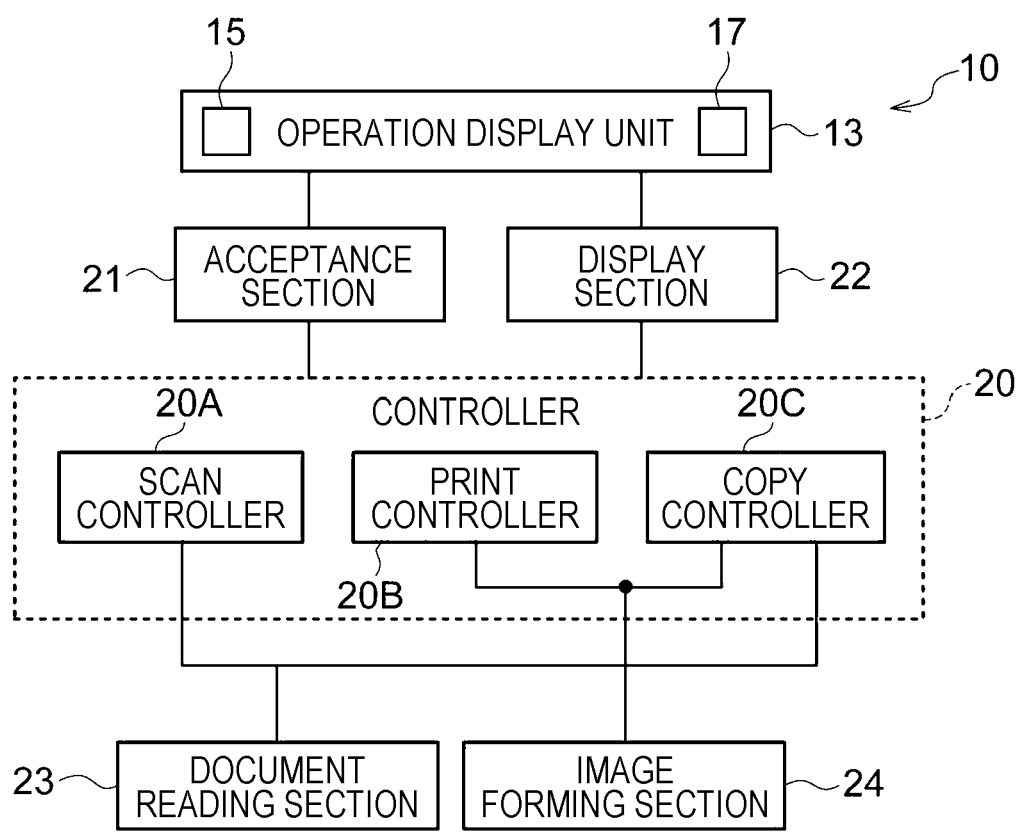
FIG. 4 is a diagram illustrating an example functional configuration of the image processing apparatus according to the exemplary embodiments.

FIG. 4 is a diagram illustrating an example functional configuration of the image processing apparatus 10 according to this exemplary embodiment. The image processing apparatus 10 includes functional sections, namely, a controller 20, an acceptance section 21, a display section 22, a document reading section 23, and an image forming section 24.

The acceptance section 21 accepts a user ID of a user who operates the image processing apparatus 10 from the reader device 17 of the operation display unit 13, and also accepts the operation position 6 of the user on the operation panel 15 from the operation panel 15 of the operation display unit 13. The acceptance section 21 further accepts image data from the terminal 4 of the user or a portable storage medium connected to the image processing apparatus 10. The acceptance section 21 notifies the controller 20 of the user ID, the operation position 6 of the user, and the image data, which have been accepted.

When notified of the user ID by the acceptance section 21, the controller 20 performs an authentication process to determine whether the user represented by the user ID is a user (referred to as a "registered user") permitted to use the image processing apparatus 10. When notified of the operation position 6 of the user on the operation panel 15 by the acceptance section 21, the controller 20 determines whether the icon image displayed at the operation position 6 of the user in the screen 30 displayed on the operation panel 15 is selected, and executes a process associated in advance with the selected icon image. For example, if the icon image is a button 8 for starting the print function, the controller 20 starts the print function to form an image represented by the image data accepted by the acceptance section 21 on a recording medium.

Since the image processing apparatus 10 has the copy function, the print function, and the scan function, the controller 20 includes a scan controller 20A that controls the scan function, a print controller 20B that controls the print function, and a copy controller 20C that controls the copy function. Any one of the scan controller 20A, the print controller 20B, and the copy controller 20C performs control in accordance with the content of the process associated with the icon image operated by the user. The image processing apparatus 10 may have a facsimile function (not illustrated). In this case, the controller 20 includes a facsimile controller that controls the facsimile function.

When the operation performed by the user through the icon image is an operation related to the scan function, the scan controller 20A controls the document reading section 23 to implement the scan function. When the operation performed by the user through the icon image is an operation related to the print function, the print controller 20B controls the image forming section 24 to implement the print function. When the operation performed by the user through the icon image is an operation related to the copy function, the copy controller 20C controls the document reading section 23 to generate image data of the document 11. Thereafter, the copy controller 20C controls the image forming section 24 to form an image represented by the generated image data on a recording medium.

The document reading section 23 drives the document reading unit 12 under the control of the scan controller 20A and the copy controller 20C to, for example, transport the document 11, which is placed on the document table 16A, and generate image data of the transported document 11.

The image forming section 24 drives the image forming unit 14 under the control of the print controller 20B and the copy controller 20C to, for example, transport a recording medium stored in any of the storage trays 19 and form an image represented by the image data on the transported recording medium.

The display section 22 displays, for example, a result of the authentication process performed on the user and a result of the process executed by the controller 20 in response to the operation performed by the user through the icon image on the operation panel 15 in the operation display unit 13 in accordance with an instruction from the controller 20.

Figure 5:
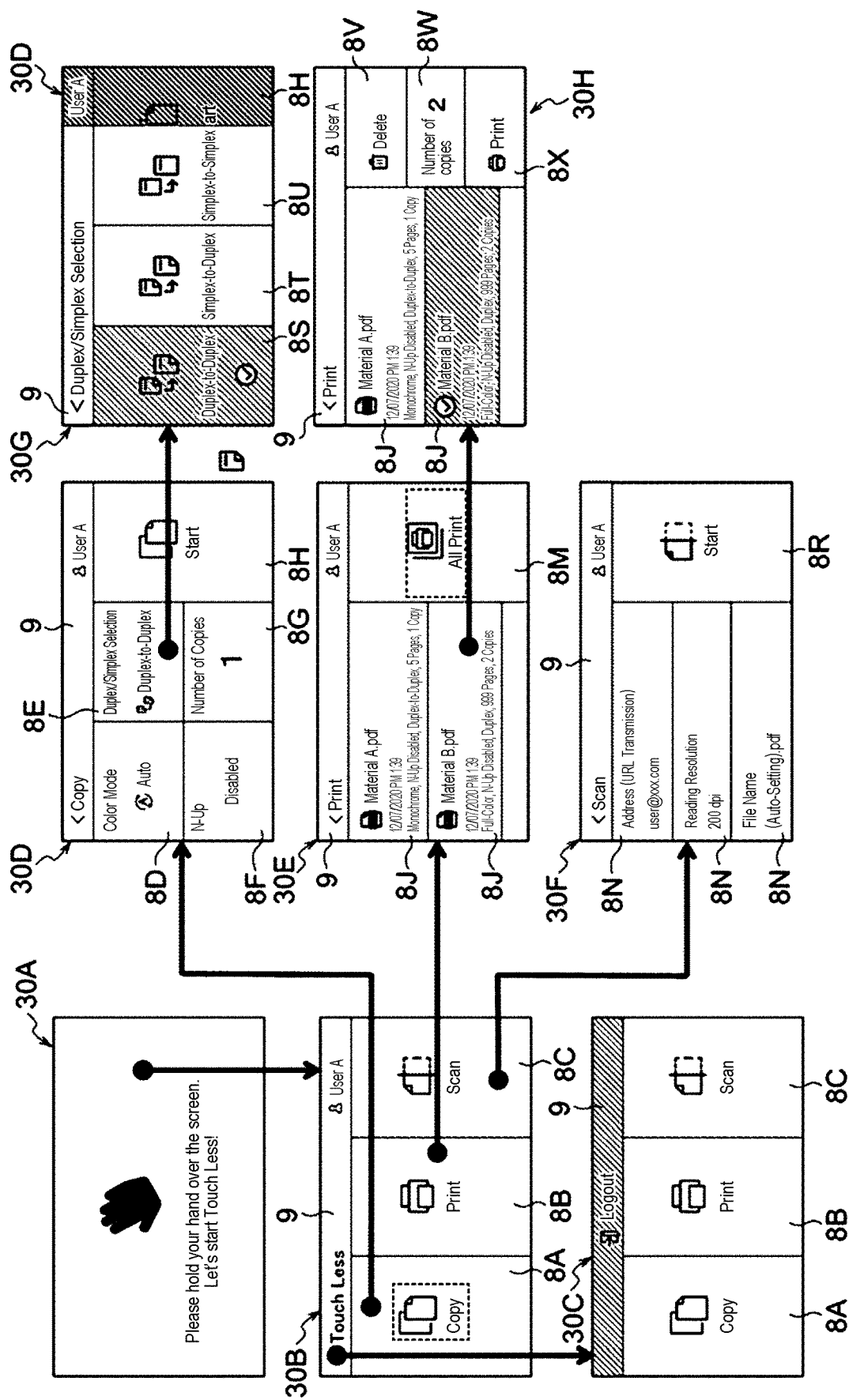
FIG. 5 is a diagram illustrating an example transition of a screen displayed on the operation panel, presenting how the screen transitions in response to the user operating the operation panel.

FIG. 5 is a diagram illustrating an example transition of the screen 30 displayed on the operation panel 15, presenting how the screen 30 transitions in response to the user operating the operation panel 15.

The display of the screen 30 on the operation panel 15, which is performed by the display section 22, may also be interpreted as the display of the screen 30 on the operation panel 15 that is performed by the controller 20 because the display section 22 displays the screen 30 in accordance with an instruction from the controller 20. A space extending along the Z axis and having a bottom surface corresponding to the display range of the screen 30 displayed on the operation panel 15 is expressed as a space "over the screen 30" or "above the screen 30", and a space extending along the Z axis and having a bottom surface corresponding to the display range of the icon image displayed in the screen 30 is expressed as "over the icon image" or "above the icon image". Like the expression "over the operation panel 15" or "above the operation panel 15", the expression "over the screen 30" or "above the screen 30" and the expression "over the icon image" or "above the icon image" do not mean the upper side of the screen 30 and the upper side of the icon image based on the up, down, left, and right directions in the real space, respectively, but mean a space in a direction facing the screen 30 and a space in a direction facing the icon image, respectively.

For convenience of description, screens 30 whose types are distinguished from each other are accompanied by different alphabet symbols associated with the types of the screens 30. Screens 30 whose types are not distinguished from each other are generically expressed as the "screen 30" regardless of their types. Buttons 8, which are an example of icon images, whose types are distinguished from each other are accompanied by different alphabet symbols associated with the types of the buttons 8. Buttons 8 whose types are not distinguished from each other are generically expressed as the "buttons 8" regardless of their types.

When it is determined that the user who performs an operation is a registered user through the authentication process, the controller 20 causes a start screen 30A to be displayed on the operation panel 15. The start screen 30A displays an instruction given to the user, such as "Please hold your hand over the screen. Let's start Touch Less!", for example.

When the user holds their finger on the start screen 30A, a cursor is displayed at the operation position 6 of the user on the start screen 30A. In the example of the start screen 30A illustrated in FIG. 5, a cursor in the shape of a hand is displayed. The shape of the cursor is an example, and, for example, a circular cursor may be displayed. In response the user holding their finger over the start screen 30A, a home screen 30B is displayed. The instruction given to the user in the start screen 30A is also used to instruct the user how to perform an operation on the operation panel 15.

The home screen 30B displays, for example, buttons 8 for individually selecting the various functions of the image processing apparatus 10, and a navigation bar 9 for displaying information useful for the user to perform an operation. Since the image processing apparatus 10 has the copy function, the print function, and the scan function, a "Copy" button 8A for selecting the copy function, a "Print" button 8B for selecting the print function, and a "Scan" button 8C for selecting the scan function are displayed on the home screen 30B. The navigation bar 9 displays, for example, the name of a user who has been authenticated, such as "user A", the name of a screen being displayed on the operation panel 15, such as "home", and information for notifying the user that the operation panel 15 is in a contactless operation mode, such as "Touch Less".

In response to the user holding their finger over the "Copy" button 8A, the "Copy" button 8A is selected. Upon selection of the "Copy" button 8A, a copy screen 30D is displayed on the operation panel 15. The copy screen 30D displays buttons 8D to 8G for setting copy conditions, and a copy start button 8H for starting copying under the set copy conditions.

The copy screen 30D illustrated in FIG. 5 displays, as an example of the buttons 8 for setting copy conditions, for example, a color mode button 8D for selecting a copy color, a duplex/simplex selection button 8E for selecting a double-sided (duplex) or single-sided (simplex) copy mode, an N-up button 8F for selecting an image layout on a recording medium, and a number-of-copies button 8G for selecting the number of copies to be made.

In response to the user holding their finger over any one of the buttons 8D to 8G for setting the respective copy conditions, the button 8 corresponding to the operation position 6 of the user is selected, and the screen 30 for setting the copy condition corresponding to the selected button 8 is displayed. In response to the duplex/simplex selection button 8E being selected on the copy screen 30D, a duplex/simplex selection screen 30G for selecting a duplex or simplex copy mode is displayed on the operation panel 15 in such a manner as to be superimposed on the copy screen The duplex/simplex selection screen 30G illustrated in FIG. 5 displays, for example, a duplex-to-duplex selection button 8S for sequentially copying two-sided documents 11 on both sides of recording media, a simplex-to-duplex selection button 8T for sequentially copying one-sided documents 11 having text and the like on either side thereof on both sides of recording media, and a simplex-to-simplex selection button 8U for sequentially copying one-sided documents 11 having text and the like on either side thereof on either side of recording media.

In response to the user holding their finger over any one of the buttons 8S to 8U on the duplex/simplex selection screen 30G, the button 8 corresponding to the operation position 6 of the user is selected, and a copy mode corresponding to the selected button 8 is set. In the example of the duplex/simplex selection screen 30G illustrated in FIG. 5, the duplex-to-duplex selection button 8S is selected by the user.

In response to a duplex or simplex copy mode being set on the duplex/simplex selection screen 30G, the copy screen 30D is displayed on the operation panel 15. After the setting of the copy mode, the copy mode selected on the duplex/simplex selection screen 30G is displayed in the duplex/simplex selection button 8E on the copy screen 30D.

In the example described above, the user selects the duplex/simplex selection button 8E on the copy screen 30D. Also in response to the user selecting any one of the color mode button 8D, the N-up button 8F, and the number-of-copies button 8G on the copy screen 30D, a selection screen for selecting a copy condition corresponding to the selected one of the buttons 8 is displayed on the operation panel 15 in a manner similar to that for the duplex/simplex selection screen 30G.

In response to the user holding their finger over the copy start button 8H on the copy screen 30D, the copy start button 8H is selected. Upon selection of the copy start button 8H, a copying process for copying the content of the documents 11 on a recording medium is executed in accordance with the set copy conditions. Before the setting of the copy conditions, the buttons 8D to 8G on the copy screen 30D display initially set copy conditions that are set in advance.

In response to the user holding their finger over the "Print" button 8B of the home screen 30B, the "Print" button 8B is selected. Upon selection of the "Print" button 8B, a print screen 30E is displayed on the operation panel 15.

The print screen 30E displays print information buttons 8J each presenting information on a piece of image data to be used for printing, and an all-print start button 8M for starting printing of all of the pieces of image data corresponding to the respective print information buttons 8J. In the example of the print screen 30E illustrated in FIG. 5, the print screen 30E in which two pieces of image data to be used for printing are accepted is illustrated. That is, the print screen 30E displays a number of print information buttons 8J equal to the number of pieces of image data accepted as targets for printing from the user, each print information button 8J corresponding to a corresponding one of the pieces of image data.

The number of pieces of image data may be too large to display the corresponding print information buttons 8J in the print screen 30E at the same time. In this case, in response to the user performing a gesture of moving their finger in an upward/downward direction of the print information buttons 8J, the operation panel 15 detects the movement of the operation position 6 and scrolls the print information buttons 8J. As a result, the hidden print information buttons 8J are displayed in the print screen 30E.

Each of the print information buttons 8J displays a file name of image data to be used for printing and print conditions set by the user in advance for the image data. For example, when the user transmits image data from the terminal 4 to the image processing apparatus 10, print conditions set by the user using the terminal 4 are displayed in the print information button 8J.

In response to the user holding their finger over the all-print start button 8M, the all-print start button 8M is selected. Upon selection of the all-print start button 8M, a printing process for printing images represented by image data on recording media is executed in accordance with the set print conditions.

In response to the user holding their finger over any one of the print information buttons 8J, the print information button 8J over which the finger is held is selected. Upon selection of any one of the print information buttons 8J, a print edit screen 30H is displayed on the operation panel 15. The print edit screen 30H illustrated in FIG. 5 is displayed, for example, in response to the user selecting the print information button 8J corresponding to the image data representing "Material B.pdf".

The print edit screen 30H displays, for example, a delete button 8V for deleting the image data corresponding to the selected print information button 8J, a change button 8W for changing a print condition of the image data corresponding to the selected print information button 8J, and an individual-print start button 8X for printing only the image data corresponding to the selected print information button 8J. The print edit screen 30H illustrated in FIG. 5 displays, as an example of the change button 8W, a change button 8W for changing the number of copies to be printed. The print edit screen 30H also displays, for example, a change button 8W (not illustrated) for changing any other print condition such as the color of an image to be printed.

In response to the user holding their finger over the "Scan" button 8C of the home screen 30B, the "Scan" button 8C is selected. Upon selection of the "Scan" button 8C, a scan screen 30F is displayed on the operation panel 15.

The scan screen 30F displays scan setting buttons 8N for setting scan conditions, and a scan start button 8R for starting reading of the documents 11 in accordance with the set scan conditions.

In response to the user holding their finger over any one of the scan setting buttons 8N, the scan setting button 8N corresponding to the operation position 6 of the user is selected, and a selection screen (not illustrated) for selecting the scan condition corresponding to the selected scan setting button 8N is displayed. That is, the user sets each of the scan conditions associated with the scan setting buttons 8N in the same manner as the operation of setting the copy conditions through the copy screen 30D. In response to the user holding their finger over the scan start button 8R, the scan start button 8R is selected. Upon selection of the scan start button 8R, a scanning process for converting the content of the documents 11 into image data is executed in accordance with the set scan conditions.

In response to the user holding their finger over the navigation bar 9 of the home screen 30B, the navigation bar 9 is selected. Upon selection of the navigation bar 9, a logout process of the authenticated user is performed, and the navigation bar 9 displays an indication of completion of the logout process (see a screen 30C).

The foregoing describes an example in which the button 8 is selected in response to the user holding their finger over the button 8. A contactless operation, in which the user's finger does not touch the operation panel 15, may cause an unintentional slip of the finger. If an icon image within which the operation position 6 is located is simply set as an icon image selected by the user, an unintentional slip of the user's finger during the contactless operation may cause another icon image adjacent to the desired icon image to be incorrectly selected. While the user moves the finger to above the desired icon image, another icon image above which the user's finger passes through may be incorrectly selected.

In this exemplary embodiment, in response to the user continuously holding their finger over an icon image for a predetermined period of time (a certain amount of time), the icon image over which the finger is held is determined to be an icon image intentionally selected by the user. In other words, if the operation position 6 of the user remains located in the area of a specific icon image on the operation panel 15 for a predetermined period of time (a certain amount of time), it is determined that the user has selected the specific icon image. In this exemplary embodiment, the predetermined period of time is 3 seconds. However, this example is not limiting. For example, the predetermined period of time may be set to a time other than 3 seconds. The operation position 6 may be detected by any method other than using the operation panel 15, which is a capacitive touch panel. For example, a time-of-flight (ToF) camera or the like may be used to detect the operation position 6.

Figure 6:
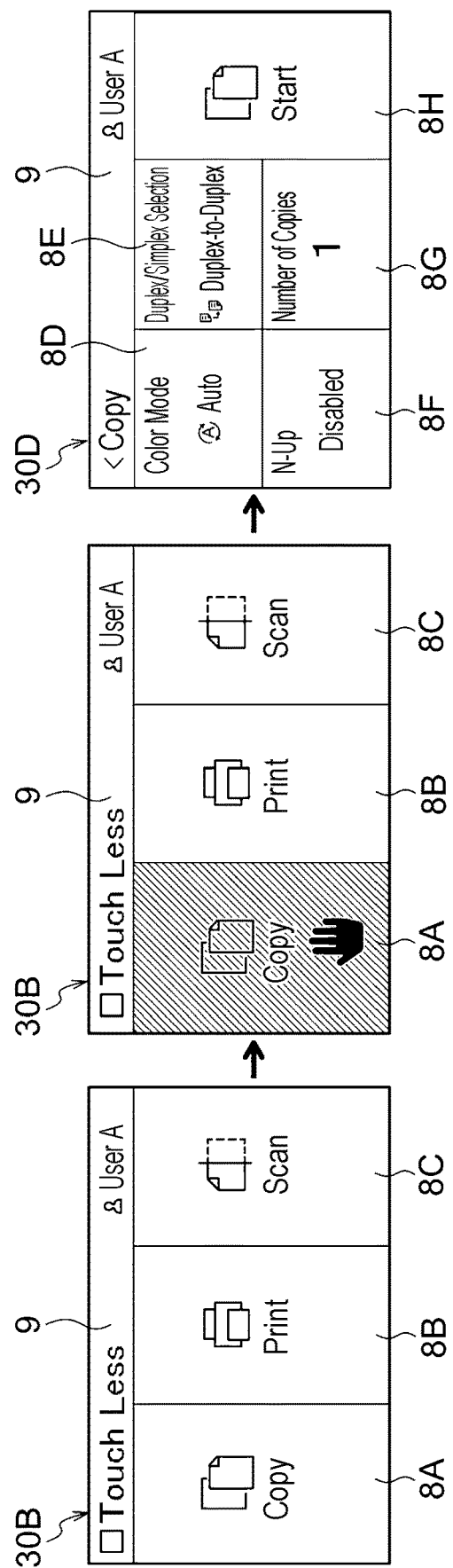
FIG. 6 is a diagram illustrating an example in which the user selects a "Copy" button, which is an example of an icon image, on a home screen.

FIG. 6 is a diagram illustrating an example in which the user selects the "Copy" button 8A, which is an example of an icon image, on the home screen 30B.

In response to the user holding their finger over the "Copy" button 8A, the operation position 6 is detected within the area of the "Copy" button 8A. The transition from an undetected state to a detected state for the operation position 6 in the area of an icon image is referred to as "selection start" or "hovering". While an icon image is in the selection start state, the icon image has not yet been selected.

When the user continuously holds their finger over the "Copy" button 8A and the detected operation position 6 remains located within the area of the "Copy" button 8A for a predetermined period of time (a certain amount of time), as illustrated in FIG. 6, the "Copy" button 8A is selected, and the copy screen 30D is displayed on the operation panel 15. The confirmation of selection of an icon image is referred to as "selection completion" or "holding". The completion of selection of an icon image is referred to as the icon image having been selected.

Accordingly, in response to the user's finger moving from over the "Copy" button 8A to another location during selection start, the selection start for the "Copy" button 8A is released. Such movement of the user's finger from over an icon image to another location during selection start is referred to as "deselection". After an icon image is deselected, if the user again continuously holds their finger over the deselected icon image for a predetermined period of time (a certain amount of time), the selection of the deselected icon image is completed.

Each of the icon images in the screen 30 is associated in advance with a process to be executed in response to the selection of the icon image such that a copying process is executed in response to selection of the copy start button 8H. To notify the user of the processes to be executed for the respective icon images, each of the icon images displays, for example, information indicating the content of the process to be executed in response to the selection of the icon image, such as "copy" for the copy start button 8H. The user understands a process associated with each of the icon images by checking information indicating the content of the process to be executed in response to the selection of the icon image, that is, by checking an item associated with the icon image. As described above, the icon images are displayed on the screen 30 in such a manner as to be associated with items each indicating the content to be processed. Accordingly, each of the icon images is an example of an "item displayed on a screen" according to this exemplary embodiment.

Figure 7:
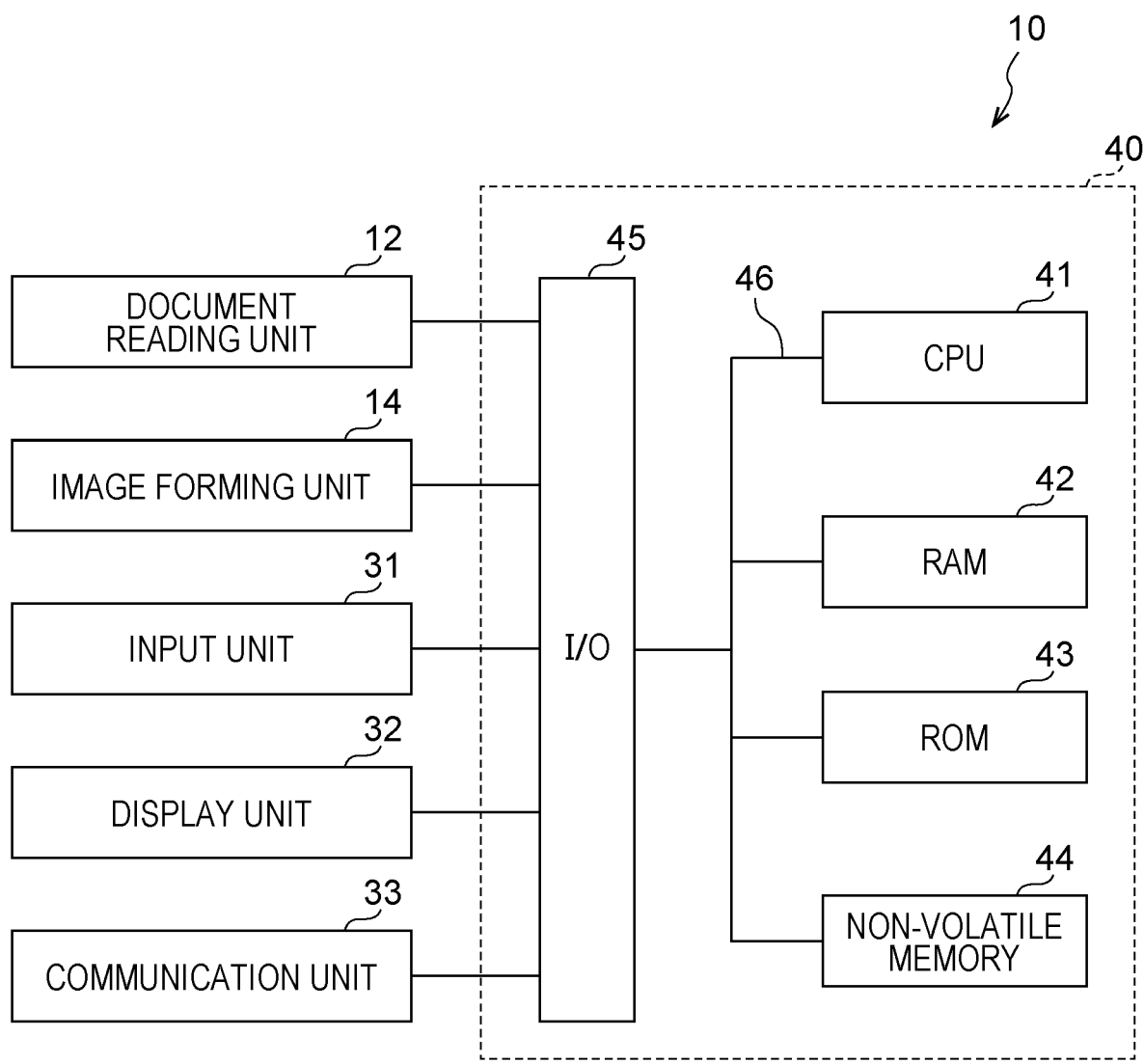
FIG. 7 is a block diagram illustrating an example configuration of a substantial part of the electrical system of the image processing apparatus according to the exemplary embodiments.

Next, the configuration of the substantial part of an electric system of the image processing apparatus 10 will be described with reference to FIG. 7. The image processing apparatus 10 is implemented using, for example, a computer 40.

In the computer 40, a central processing unit (CPU) 41, a random access memory (RAM) 42, a read only memory (ROM) 43, a non-volatile memory 44, and an input/output interface (I/O) 45 are connected to each other via a bus 46.

The CPU 41 is an example of a processor configured to perform processing of the functional sections of the image processing apparatus 10 illustrated in FIG. 4. The RAM 42 is an example of a storage medium to be used as a temporary work area for the CPU 41. The ROM 43 is an example of a storage medium that stores an information processing program to be executed by the CPU 41. The non-volatile memory 44 is an example of a storage medium configured such that information stored therein is maintained even if power supply to the non-volatile memory 44 is shut off. Examples of the non-volatile memory 44 include a semiconductor memory and a hard disk. The non-volatile memory 44 is not necessarily incorporated in the computer 40, and may be, for example, a storage medium attachable to the computer 40 in a removable manner, such as a memory card.

The I/O 45 is connected to, for example, the document reading unit 12, the image forming unit 14, an input unit 31, a display unit 32, and a communication unit 33.

The document reading unit 12 and the image forming unit 14 are devices that perform operations as described above. The input unit 31 is a device that notifies the CPU 41 of an instruction from the user and a user ID of the user in response to receipt of the instruction and the user ID. Examples of the input unit 31 include a touch panel constituting the operation panel 15, and the reader device 17. The display unit 32 is a device that visually displays information processed by the CPU 41. Examples of the display unit 32 include a display constituting the operation panel 15. The communication unit 33 is connected to the communication line 2 and has a communication protocol for communicating with the terminals 4. The units connectable to the I/O 45 are not limited to the units illustrated in FIG. 7. The I/O 45 may be connected to a unit necessary for implementing a function in accordance with the functions of the image processing apparatus 10.

As described above, in the determination of the operation by the difference in distance from the screen, a contactless operation, which is performed in the air without touching the screen, makes it difficult for the user to visually grasp the distance from the screen and also grasp the content of the operation corresponding to the distance.

In the image processing apparatus 10 according to this exemplary embodiment, in response to detection of the hand 3 of the user performing contactless operation over the screen 30, a first frame centered on a position on the screen 30 corresponding to the position of the detected hand 3 is displayed in accordance with the distance between the screen 30 and the hand 3 of the user, and a plurality of second frames centered on the position on the screen 30 corresponding to the position of the detected hand 3 and having a different display form from the first frame are displayed in association with a plurality of regions defined in accordance with the distance from the screen 30. The plurality of regions are assigned in advance different operations to be performed in response to contactless operation.

Figure 8:
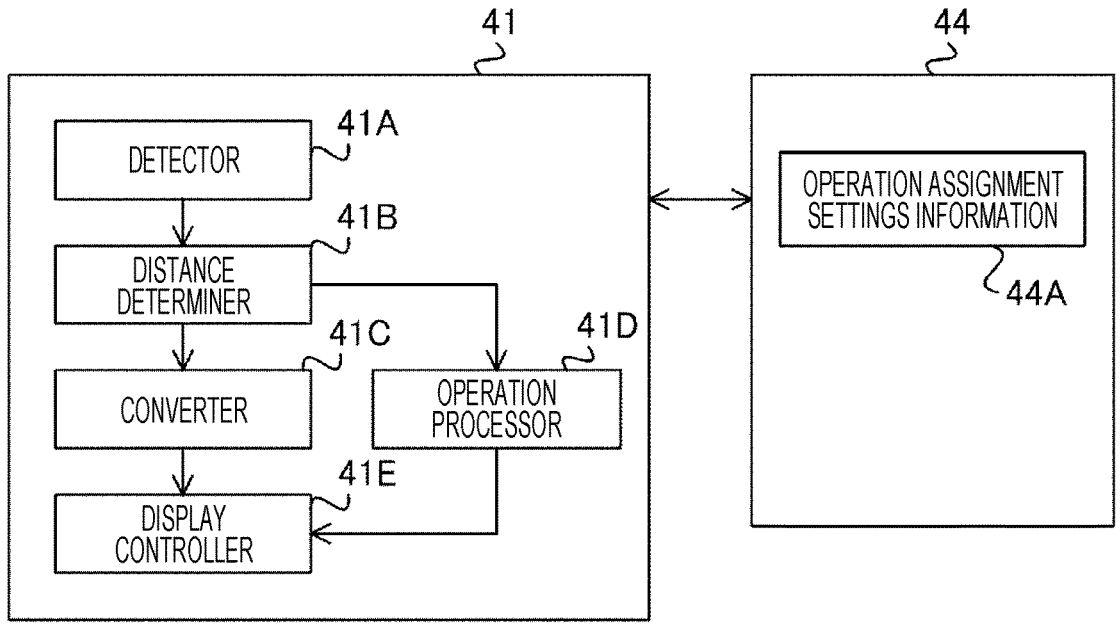
FIG. 8 is a block diagram illustrating an example functional configuration of an image processing apparatus according to a first exemplary embodiment.

Specifically, the CPU 41 of the image processing apparatus 10 according to this exemplary embodiment functions as the components illustrated in FIG. 8 by loading an information processing program stored in the ROM 43 into the RAM 42 and executing the information processing program.

FIG. 8 is a block diagram illustrating an example functional configuration of the image processing apparatus 10 according to the first exemplary embodiment.

As illustrated in FIG. 8, the CPU 41 of the image processing apparatus 10 according to this exemplary embodiment functions as a detector 41A, a distance determiner 41B, a converter 41C, an operation processor 41D, and a display controller 41E.

The non-volatile memory 44 stores operation assignment settings information 44A. The operation assignment settings information 44A is information indicating the number of regions obtained by division and the respective operations to be assigned to the regions.

Figure 9:
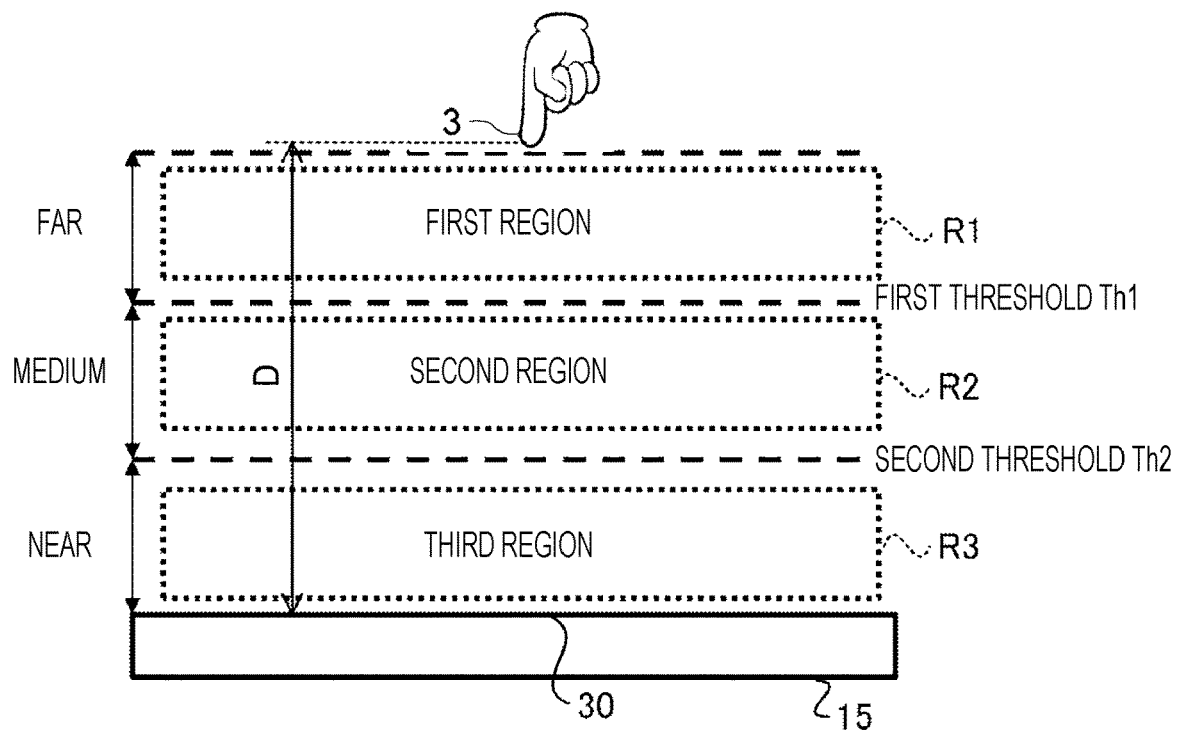
FIG. 9 is a diagram schematically illustrating an example of a spatial region above an operation panel according to the exemplary embodiments when the operation panel is viewed from a side.

FIG. 9 is a diagram schematically illustrating an example of a spatial region above the operation panel 15 according to this exemplary embodiment when the operation panel 15 is viewed from a side.

In the example illustrated in FIG. 9, the spatial region is divided into three regions including a first region R1, a second region R2, and a third region R3. The first region R1 is assigned a "pointing operation", the second region R2 is assigned a "clicking operation", and the third region R3 is assigned a "dragging operation". In other words, the operation assignment settings information 44A described above is information indicating the number of regions into which the spatial region is divided and the respective operations assigned to the regions. The "pointing operation" refers to an operation of pointing at a certain position on the screen 30. The "clicking operation" refers to an operation of clicking on a certain position or a certain icon image on the screen 30. The "dragging operation" refers to an operation of dragging a certain icon image on the screen 30 to a certain position on the screen 30. The assignable operations include, for example, pointing, clicking, double-clicking, long-pressing, dragging, and scrolling operations. The number of regions obtained by division is not limited to three, and may be two or four or more.

The first region R1 and the second region R2 are separated by a first threshold Th1, and the second region R2 and the third region R3 are separated by a second threshold Th2. The first threshold Th1 and the second threshold Th2 are thresholds for the distance from the screen 30 to the hand 3 of the user (i.e., the operation distance D) and are set to appropriate values within a range not exceeding the distance at which the hand 3 of the user is detectable. The first threshold Th1 and the second threshold Th2 are also included in the operation assignment settings information 44A. That is, the first region R1, the second region R2, and the third region R3 are defined in accordance with their distance from the screen 30, and are assigned in advance different operations to be performed in response to contactless operation. The operations to be assigned to the first region R1, the second region R2, and the third region R3 may be set as appropriate by the user. The first region R1, the second region R2, and the third region R3 are generically referred to as "regions R" unless they are distinguished.

The detector 41A detects the hand 3 of the user above the screen 30 and identifies the position of the detected hand 3 of the user. The position of the detected hand 3 of the user is identified as a coordinate point (x, y, z), as described above.

The distance determiner 41B determines the distance (the operation distance D) from the screen 30 to the hand 3 of the user detected by the detector 41A. The distance (the operation distance D) from the screen 30 to the hand 3 of the user is determined by, for example, the change in electrostatic capacitance, as described above.

The converter 41C converts the distance determined by the distance determiner 41B into the first frame. The converter 41C converts the regions R obtained from the operation assignment settings information 44A into the plurality of second frames.

The operation processor 41D identifies a spatial region where the hand 3 of the user is located, based on the distance determined by the distance determiner 41B, and identifies the operation assigned to the identified spatial region from the operation assignment settings information 44A. The operation processor 41D performs an operation corresponding to the identified operation.

The display controller 41E performs control to display the first frame and the plurality of second frames, which are obtained by the converter 41C through conversion, on the screen 30. Further, the display controller 41E controls the display of the screen 30 in accordance with the operation to be performed by the operation processor 41D.

Upon detection of the hand 3 of the user performing contactless operation over the screen 30, the display controller 41E performs control to display the first frame centered on a position on the screen 30 corresponding to the position of the detected hand 3 in accordance with the distance (the operation distance D) between the screen 30 and the hand 3 of the user. The display controller 41E performs control to display the plurality of second frames centered on the position on the screen 30 corresponding to the position of the detected hand 3, in association with the plurality of regions R defined in accordance with their distance from the screen 30. The plurality of regions R are assigned in advance different operations to be performed in response to contactless operation. The plurality of second frames have a different display form from the first frame. The first frame and the plurality of second frames may be displayed simultaneously. Alternatively, the plurality of second frames may be displayed after the first frame is displayed, or the first frame may be displayed after the plurality of second frames are displayed.

A specific example of the first frame and the plurality of second frames displayed on the screen 30 will be described with reference to FIGS. 10A and 10B.

Figure 10A:
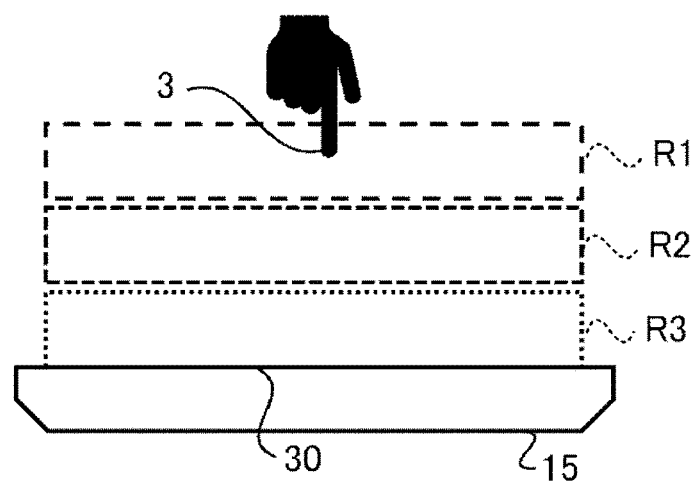
FIG. 10A is a diagram schematically illustrating an example of a plurality of spatial regions above the operation panel when the operation panel is viewed from the side.

FIG. 10A is a diagram schematically illustrating an example of the plurality of regions R in the space above the operation panel 15 when the operation panel 15 is viewed from a side. FIG. 10B is a diagram illustrating an example of a first frame W1 and a plurality of second frames W2 when the operation panel 15 is viewed in a direction facing the operation panel 15. While the plurality of second frames W2 are illustrated as a plurality of second frames W21 to W23, the plurality of second frames W21 to W23 are generically referred to as "second frames W2" unless they are distinguished.

Figure 10B:
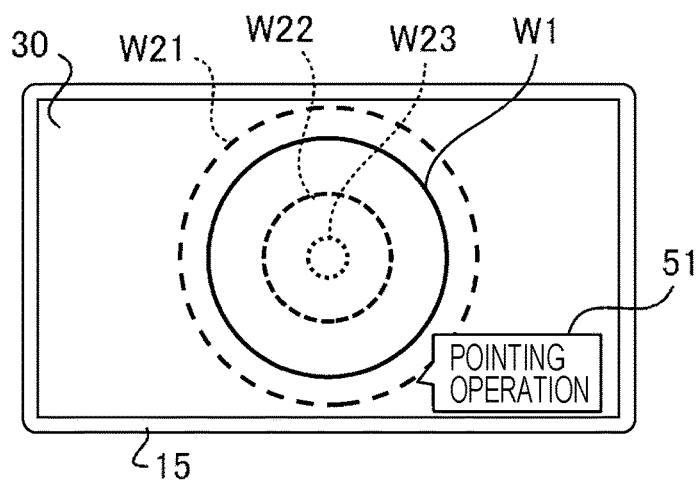
FIG. 10B is a diagram illustrating an example of a first frame and a plurality of second frames when the operation panel is viewed in a direction facing the operation panel.

As illustrated in FIGS. 10A and 10B, the screen 30 displays the first frame W1 and the plurality of second frames W21 to W23 centered on a position on the screen 30 corresponding to the detected position of the hand 3 of the user, in accordance with the distance between the screen 30 and the hand 3 of the user. The first region R1 is associated with the second frame W21, the second region R2 is associated with the second frame W22, and the third region R3 is associated with the second frame W23.

In the example illustrated in FIGS. 10A and 10B, the first frame W1, which is displayed when the distance between the screen 30 and the hand 3 of the user is a first distance, has a smaller size than a frame displayed when the distance between the screen 30 and the hand 3 of the user is a second distance longer than the first distance. That is, the size of the first frame W1 decreases as the distance between the screen 30 and the hand 3 of the user decreases. The second frames W2 have sizes such that the size of the frame corresponding to the region closest to the screen 30 is the smallest and the size of the frame corresponding to the region farthest from the screen 30 is the largest. In other words, the second frame W23 corresponding to the third region R3 is the smallest, and the second frame W21 corresponding to the first region R1 is the largest. The first frame W1 and the plurality of second frames W21 to W23 are displayed concentrically around the position on the screen 30 corresponding to the detected position of the hand 3 of the user. The first frame W1 and the plurality of second frames W21 to W23 are illustrated as being circular. The shape of the first frame W1 and the plurality of second frames W21 to W23 may be other than circular, and may be rectangular, for example.

The first frame W1 is different in at least one of line type and color from the plurality of second frames W21 to W23. The plurality of second frames W21 to W23 are different in at least one of line type and color in accordance with the associated regions R. In the example illustrated in FIGS. 10A and 10B, the first frame W1 is represented by a solid black line, the second frame W21 is represented by a dotted blue line, the second frame W22 is represented by a dotted yellow line, and the second frame W23 is represented by a dotted red line. The dotted lines representing the second frames W21 to W23 may be different in dot spacing and/or thickness, for example. Alternatively, the second frames W21 to W23 may be represented by a gradation of colors (such as a change of colors from light blue to dark blue).

The plurality of second frames W21 to W23 may be displayed such that text information indicating the content of the operation assigned to the region R where the hand 3 of the user is detected among the plurality of regions R1 to R3 respectively corresponding to the plurality of second frames W21 to W23 is selectively displayed. In the example illustrated in FIGS. 10A and 10B, the hand 3 of the user is detected in the first region R1, and only text information 51 representing the "pointing operation", which is the operation assigned to the first region R1, is selectively displayed.

Figure 11:
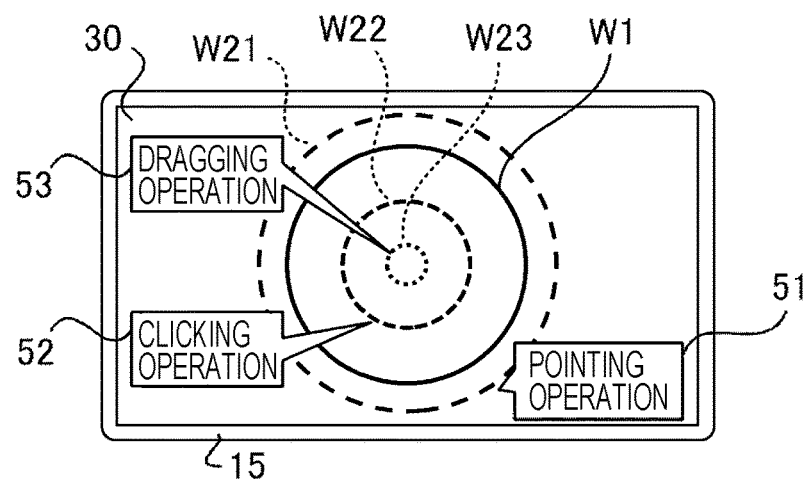
FIG. 11 is a diagram illustrating another example of the first frame and the plurality of second frames when the operation panel is viewed in the direction facing the operation panel.

FIG. 11 is a diagram illustrating another example of the first frame W1 and the plurality of second frames W2 when the operation panel 15 is viewed in a direction facing the operation panel 15.

As illustrated in FIG. 11, the plurality of second frames W21 to W23 may be displayed such that text information indicating the content of each of the operations assigned to the plurality of regions R1 to R3 respectively corresponding to the plurality of second frames W21 to W23 is displayed.

In the example illustrated in FIG. 11, although the hand 3 of the user is detected in the first region R1, the text information 51 representing the "pointing operation," which is the operation assigned to the first region R1, text information 52 representing the "clicking operation," which is the operation assigned to the second region R2, and text information 53 representing the "dragging operation," which is the operation assigned to the third region R3, are displayed.

Figure 12A:
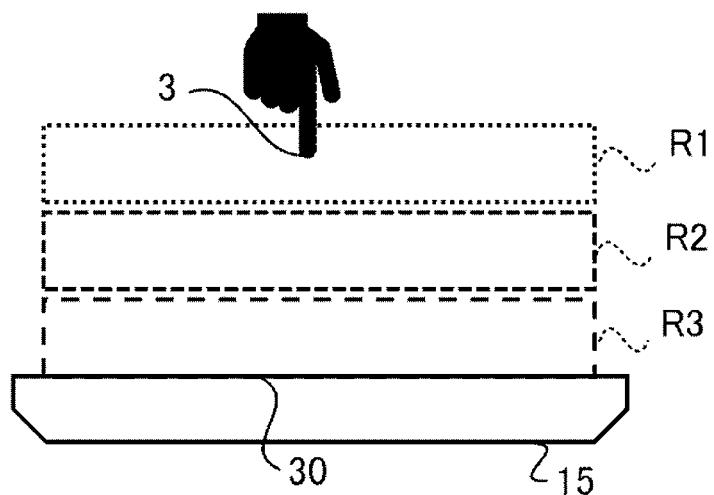
FIG. 12A is a diagram schematically illustrating still another example of a plurality of spatial regions above the operation panel when the operation panel is viewed from the side.
Figure 12B:
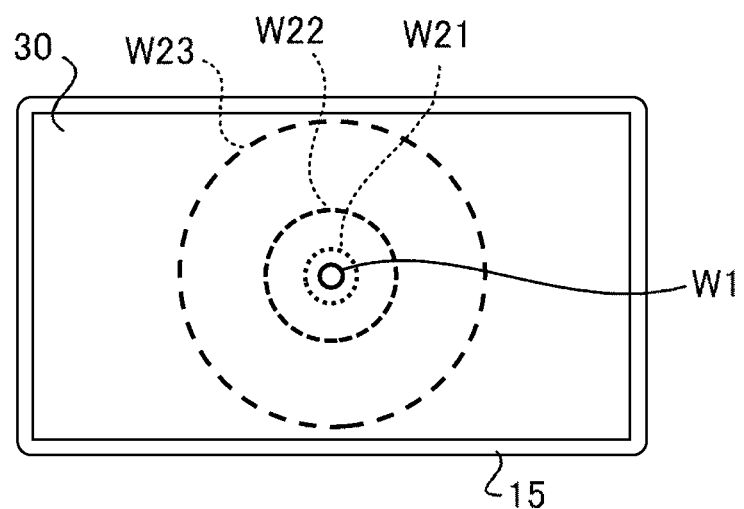
FIG. 12B is a diagram illustrating still another example of the first frame and the plurality of second frames when the operation panel is viewed in the direction facing the operation panel.

FIG. 12A is a diagram schematically illustrating still another example of the plurality of regions R in the space above the operation panel 15 when the operation panel 15 is viewed from a side. FIG. 12B is a diagram illustrating still another example of the first frame W1 and the plurality of second frames W2 when the operation panel 15 is viewed in a direction facing the operation panel 15.

In the example illustrated in FIGS. 12A and 12B, the first frame W1, which is displayed when the distance between the screen 30 and the hand 3 of the user is a first distance, has a larger size than a frame displayed when the distance between the screen 30 and the hand 3 of the user is a second distance longer than the first distance. That is, the size of the first frame W1 increases as the distance between the screen 30 and the hand 3 of the user decreases. The second frames W2 have sizes such that the size of the frame corresponding to the region closest to the screen 30 is the largest and the size of the frame corresponding to the region farthest from the screen 30 is the smallest. In other words, the second frame W23 corresponding to the third region R3 is the largest, and the second frame W21 corresponding to the first region R1 is the smallest.

Next, assignment of a "fine-tuning pointing operation" or "fine-tuning dragging operation" to a region R will be described with reference to FIGS. 13A and 13B.

Figure 13A:
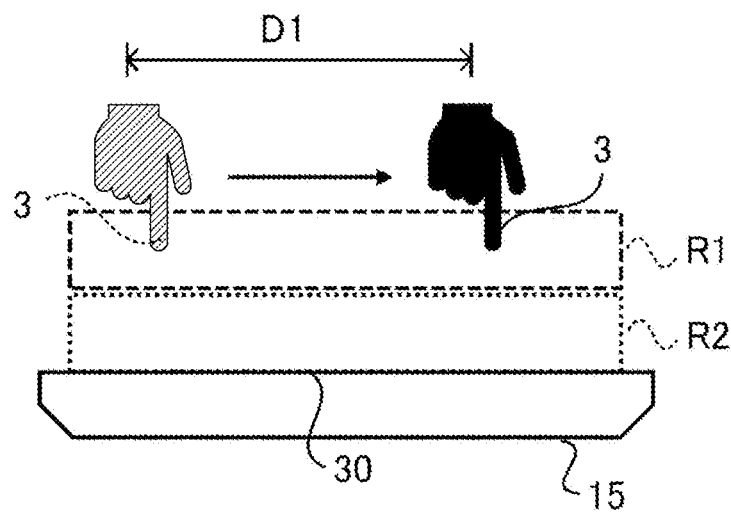
FIG. 13A is a diagram schematically illustrating still another example of a plurality of spatial regions above the operation panel when the operation panel is viewed from the side.

FIG. 13A is a diagram schematically illustrating still another example of the plurality of regions R in the space above the operation panel 15 when the operation panel 15 is viewed from a side. FIG. 13B is a diagram illustrating still another example of the first frame W1 and the plurality of second frames W2 when the operation panel 15 is viewed in a direction facing the operation panel 15.

Figure 13B:
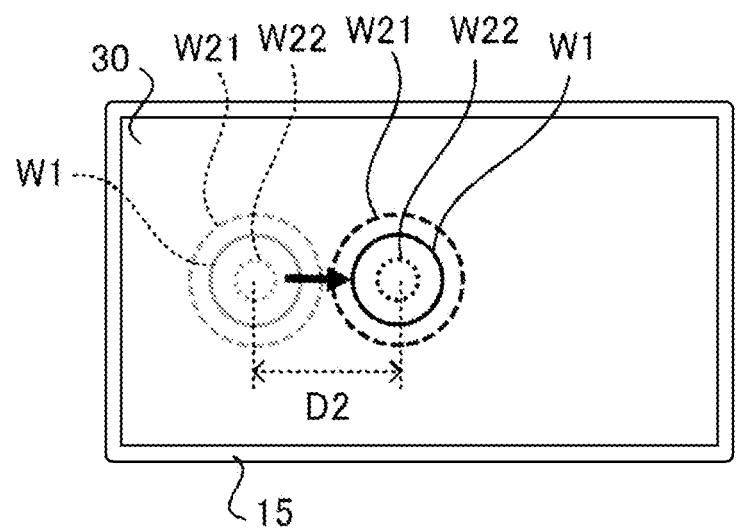
FIG. 13B is a diagram illustrating still another example of the first frame and the plurality of second frames when the operation panel is viewed in the direction facing the operation panel.

As illustrated in FIGS. 13A and 13B, the screen 30 displays the first frame W1 and a plurality of second frames W21 and W22 centered on a position on the screen 30 corresponding to the detected position of the hand 3 of the user, in accordance with the distance between the screen 30 and the hand 3 of the user. The first region R1 is associated with the second frame W21, and the second region R2 is associated with the second frame W22.

The "fine-tuning pointing operation" and the "fine-tuning dragging operation" are examples of an operation in which the amount of movement of the first frame W1, which corresponds to the detected position of the hand 3 of the user, per unit time is smaller than the amount of movement of the hand 3 of the user per unit time. In other words, the "fine-tuning pointing operation" is an operation in which the amount of movement of the first frame W1 (the pointing position on the screen 30) per unit time is smaller than the amount of movement of the hand 3 of the user per unit time, and the "fine-tuning dragging operation" is an operation in which the amount of movement of the first frame W1 (the drag position on the screen 30) per unit time is smaller than the amount of movement of the hand 3 of the user per unit time.

FIGS. 13A and 13B illustrate an example of the "fine-tuning pointing operation". Specifically, an amount of movement D2 of the first frame W1, which corresponds to the detected position of the hand 3 of the user, per unit time is smaller than an amount of movement D1 of the hand 3 of the user per unit time. The same applies to the "dragging operation".

This facilitates fine operations that are difficult for the user to perform with the hand 3 without touching the operation panel 15. The fine operations are suitable for use in the selection of text or the drawing of a shape, for example.

In one example, a notification may be issued upon the hand 3 of the user approaching the screen 30 for health, safety, and other reasons, which will be described with reference to FIGS. 14A and 14B.

Figure 14A:
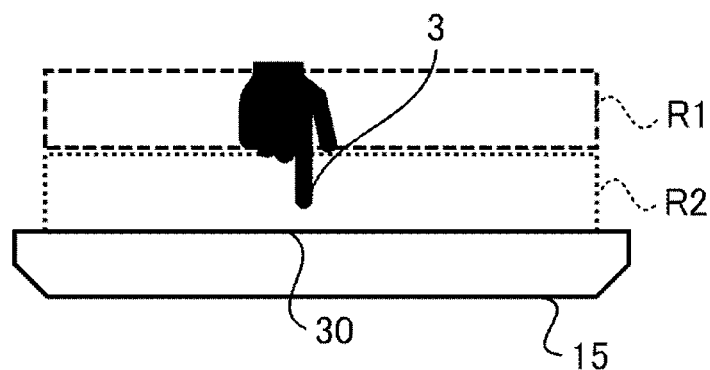
FIG. 14A is a diagram schematically illustrating still another example of a plurality of spatial regions above the operation panel when the operation panel is viewed from the side.

FIG. 14A is a diagram schematically illustrating still another example of the plurality of regions R in the space above the operation panel 15 when the operation panel 15 is viewed from a side. FIG. 14B is a diagram illustrating still another example of the first frame W1 and the plurality of second frames W2 when the operation panel 15 is viewed in a direction facing the operation panel 15.

Figure 14B:
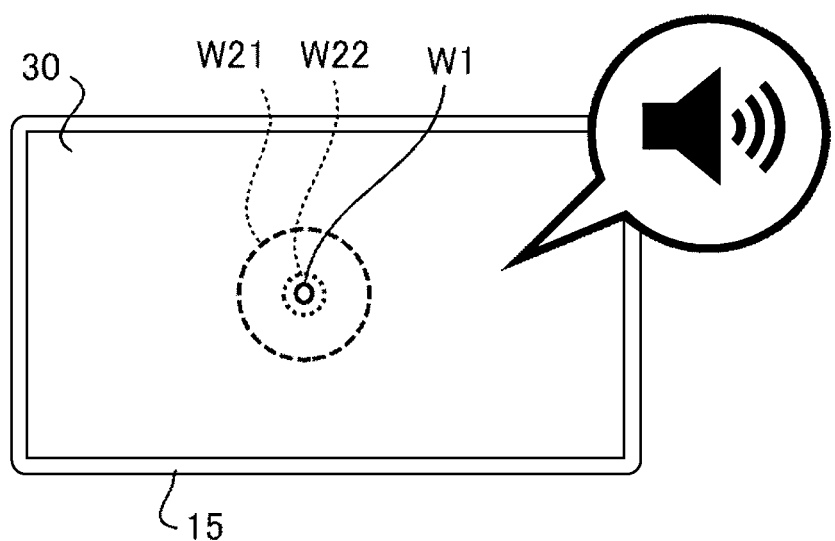
FIG. 14B is a diagram illustrating still another example of the first frame and the plurality of second frames when the operation panel is viewed in the direction facing the operation panel.

As illustrated in FIGS. 14A and 14B, the screen 30 displays the first frame W1 and a plurality of second frames W21 and W22 centered on a position on the screen 30 corresponding to the detected position of the hand 3 of the user, in accordance with the distance between the screen 30 and the hand 3 of the user. The first region R1 is associated with the second frame W21, and the second region R2 is associated with the second frame W22.

In the example illustrated in FIGS. 14A and 14B, upon detection of the hand 3 of the user located in the region (e.g., the second region R2) closest to the screen 30 among the plurality of regions R, the user is notified that the hand 3 of the user is near the screen 30. The notification is provided via voice or warning sound, for example. The notification may be provided via text or other methods.

The issuance of a notification is suitable for cases where it is desirable that the hand 3 of the user not come into contact with the screen 30 for health, safety, and other reasons.

Figure 15A:
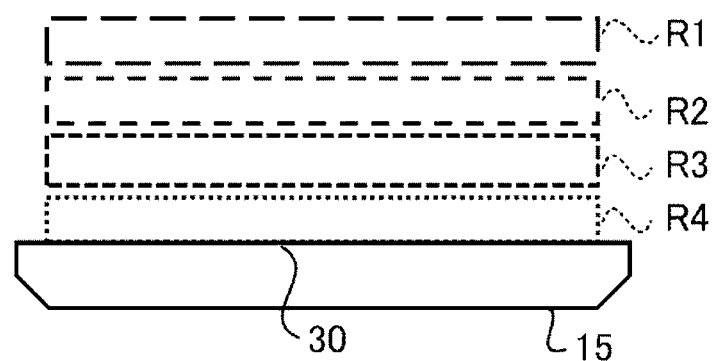
FIG. 15A is a diagram schematically illustrating still another example of a plurality of spatial regions above the operation panel when the operation panel is viewed from the side.
Figure 15B:
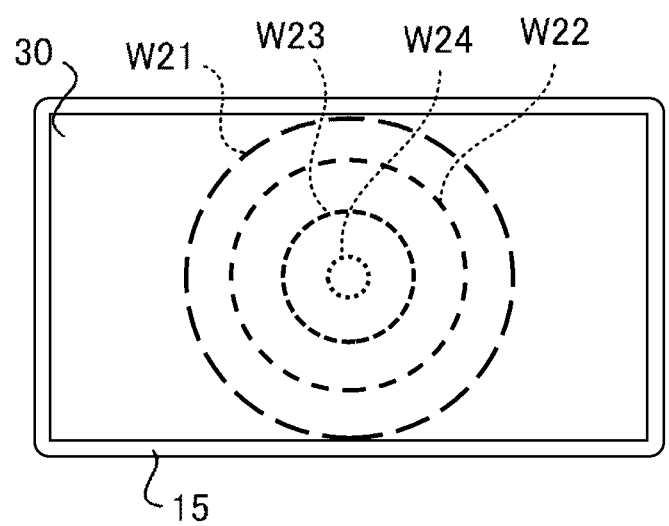
FIG. 15B is a diagram illustrating still another example of the first frame and the plurality of second frames when the operation panel is viewed in the direction facing the operation panel.

In one example, as illustrated in FIGS. 15A and 15B, the number of regions R may be increased, and the width of each of the regions R may be set shorter to enable the execution of multiple types of operations (e.g., four or more types of operations) to improve work efficiency.

FIG. 15A is a diagram schematically illustrating still another example of the plurality of regions R in the space above the operation panel 15 when the operation panel 15 is viewed from a side. FIG. 15B is a diagram illustrating still another example of the first frame W1 and the plurality of second frames W2 when the operation panel 15 is viewed in a direction facing the operation panel 15.

As illustrated in FIGS. 15A and 15B, the screen 30 displays the first frame W1 (not illustrated) and a plurality of second frames W21 to W24 centered on a position on the screen 30 corresponding to the detected position of the hand 3 of the user, in accordance with the distance between the screen 30 and the hand 3 of the user. The first region R1 is associated with the second frame W21, the second region R2 is associated with the second frame W22, the third region R3 is associated with the second frame W23, and a fourth region R4 is associated with the second frame W24. The first region R1 is assigned a "pointing operation", the second region R2 is assigned a "fine-tuning pointing operation", the third region R3 is assigned a "clicking operation", and the fourth region R4 is assigned a "dragging operation".

Figure 16A:
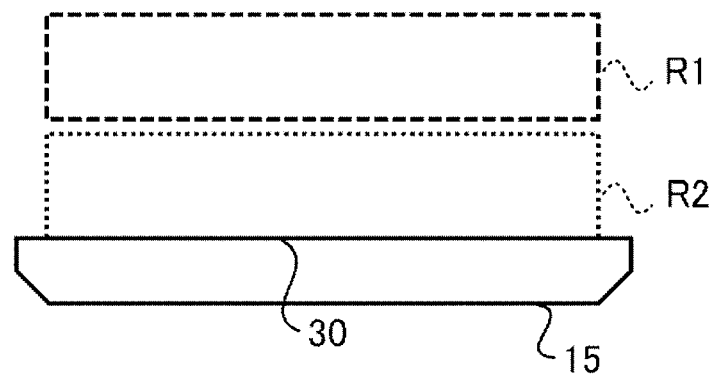
FIG. 16A is a diagram schematically illustrating still another example of a plurality of spatial regions above the operation panel when the operation panel is viewed from the side.
Figure 16B:
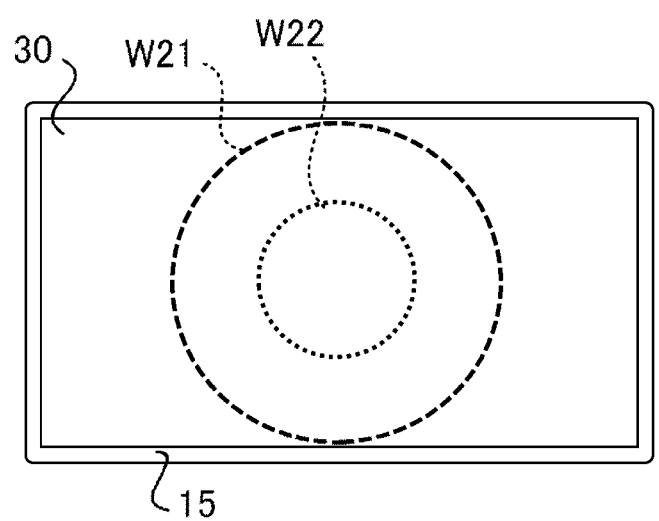
FIG. 16B is a diagram illustrating still another example of the first frame and the plurality of second frames when the operation panel is viewed in the direction facing the operation panel.

In one example, as illustrated in FIGS. 16A and 16B, the number of regions R may be reduced, and the width of each of the regions R may be set longer to ensure reliable operation with reduced errors.

FIG. 16A is a diagram schematically illustrating still another example of the plurality of regions R in the space above the operation panel 15 when the operation panel 15 is viewed from a side. FIG. 16B is a diagram illustrating still another example of the first frame W1 and the plurality of second frames W2 when the operation panel 15 is viewed in a direction facing the operation panel 15.

As illustrated in FIGS. 16A and 16B, the screen 30 displays the first frame W1 (not illustrated) and a plurality of second frames W21 and W22 centered on a position on the screen 30 corresponding to the detected position of the hand 3 of the user, in accordance with the distance between the screen 30 and the hand 3 of the user. The first region R1 is associated with the second frame W21, and the second region R2 is associated with the second frame W22. In the illustrated example, the first region R1 is assigned a "pointing operation", and the second region R2 is assigned a "clicking operation".

Figure 17A:
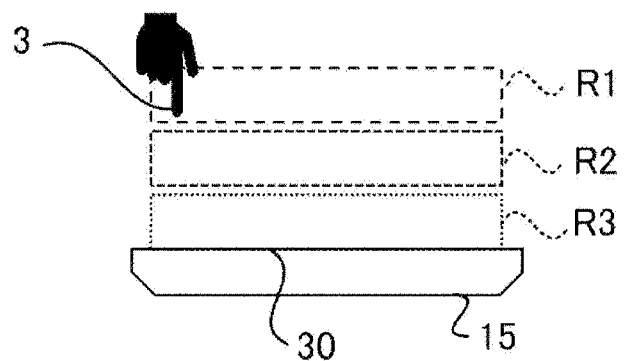
FIG. 17A is a diagram schematically illustrating still another example of a plurality of spatial regions above the operation panel when the operation panel is viewed from the side.
Figure 17B:
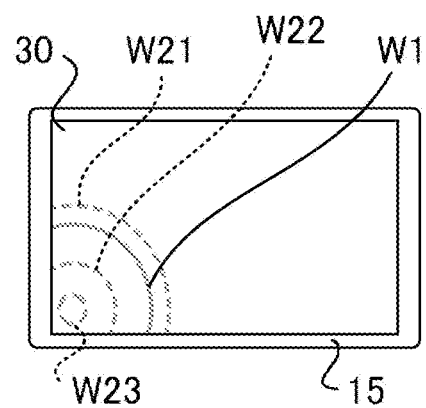
FIG. 17B is a diagram illustrating still another example of the first frame and the plurality of second frames when the operation panel is viewed in the direction facing the operation panel.

FIG. 17A is a diagram schematically illustrating still another example of the plurality of regions R in the space above the operation panel 15 when the operation panel 15 is viewed from a side. FIG. 17B is a diagram illustrating still another example of the first frame W1 and the plurality of second frames W2 when the operation panel 15 is viewed in a direction facing the operation panel 15.

As illustrated in FIGS. 17A and 17B, the screen 30 displays the first frame W1 and a plurality of second frames W21 to W23 centered on a position on the screen 30 corresponding to the detected position of the hand 3 of the user, in accordance with the distance between the screen 30 and the hand 3 of the user. The first region R1 is associated with the second frame W21, the second region R2 is associated with the second frame W22, and the third region R3 is associated with the second frame W23.

In the example illustrated in FIGS. 17A and 17B, as described above, the first frame W1 and the plurality of second frames W2, which are concentric with each other, prevent the first frame W1 and the plurality of second frames W2 from being completely hidden even if the position corresponding to the detected position of the hand 3 of the user is in the edge of the screen 30. In addition, the first frame W1 and the plurality of second frames W2, which are concentric with each other, prevent the first frame W1 and the plurality of second frames W2 from being completely hidden by the hand 3 of the user.

Next, the operation of the image processing apparatus 10 according to the first exemplary embodiment will be described with reference to FIG. 18.

FIG. 18 is a flowchart illustrating an example of a process based on an information processing program according to the first exemplary embodiment.

First, in response to an instruction to execute a contactless input through the operation panel 15, the CPU 41 activates the information processing program and executes the steps described below.

Referring to FIG. 18, in step S101, the CPU 41 reads the operation assignment settings information 44A from the non-volatile memory 44.

In step S102, the CPU 41 determines whether a contactless input from the user is detected. For example, if it is determined that the hand 3 of the user is detected as a contactless input from the user (if a positive determination is made), the process proceeds to step S103. If it is determined that the hand 3 of the user is not detected (if a negative determination is made), the process stands by in step S102.

In step S103, in one example, as illustrated in FIGS. 10A and 10B described above, the CPU 41 performs control to display the plurality of second frames W2, which are centered on a position on the screen 30 corresponding to the detected position of the hand 3 of the user, on the screen 30 in association with the plurality of regions R, which are assigned in advance different operations to be performed in response to contactless operation.

In step S104, the CPU 41 determines the distance from the screen 30 to the hand 3 of the user.

In step S105, in one example, as illustrated in FIGS. 10A and 10B described above, the CPU 41 performs control to display the first frame W1, which is centered on the position on the screen 30 corresponding to the detected position of the hand 3 of the user, in accordance with the distance determined in step S104. The timing of displaying the plurality of second frames W2 and the first frame W1 is not limited, and the plurality of second frames W2 and the first frame W1 may be displayed simultaneously.

In step S106, the CPU 41 updates distance information indicating the distance from the screen 30 to the hand 3 of the user in accordance with a movement of the detected position of the hand 3 of the user.

In step S107, the CPU 41 updates the display of the first frame W1 on the screen 30 in accordance with the distance information updated in step S106.

In step S108, the CPU 41 performs an operation corresponding to the distance from the screen 30 to the hand 3 of the user.

In step S109, the CPU 41 determines whether the exit timing is reached. If it is determined that the exit timing is not reached (if a negative determination is made), the process returns to step S102, and the operations are repeatedly performed. If it is determined that the exit timing is reached (if a positive determination is made), the series of operations based on the information processing program ends. As used herein, the term "exit timing" refers to a timing at which the power is turned off or a timing at which the image processing apparatus 10 enters a sleep mode, for example.

In this exemplary embodiment, accordingly, in response to detection of an object performing contactless operation over a screen, a first frame centered on a position on the screen corresponding to the position of the detected object is displayed in accordance with the distance between the screen and the object, and a plurality of second frames centered on the position on the screen corresponding to the position of the detected object and having a different display form from the first frame are displayed in association with a plurality of regions defined in accordance with the distance from the screen. This configuration may enable the user performing contactless operation over the screen to visually grasp the correspondence between a distance from the screen and an operation that differs depending on the distance.

Second Exemplary Embodiment

In the first exemplary embodiment described above, if the object has moved from an initial region to another region during the contactless operation, an operation corresponding to the other region to which the object has moved may be performed. In a second exemplary embodiment, in contrast, even if the object has moved from an initial region to another region during the contactless operation, an operation corresponding to the initial region is performed, instead of an operation corresponding to the other region to which the object has moved.

Figure 19:
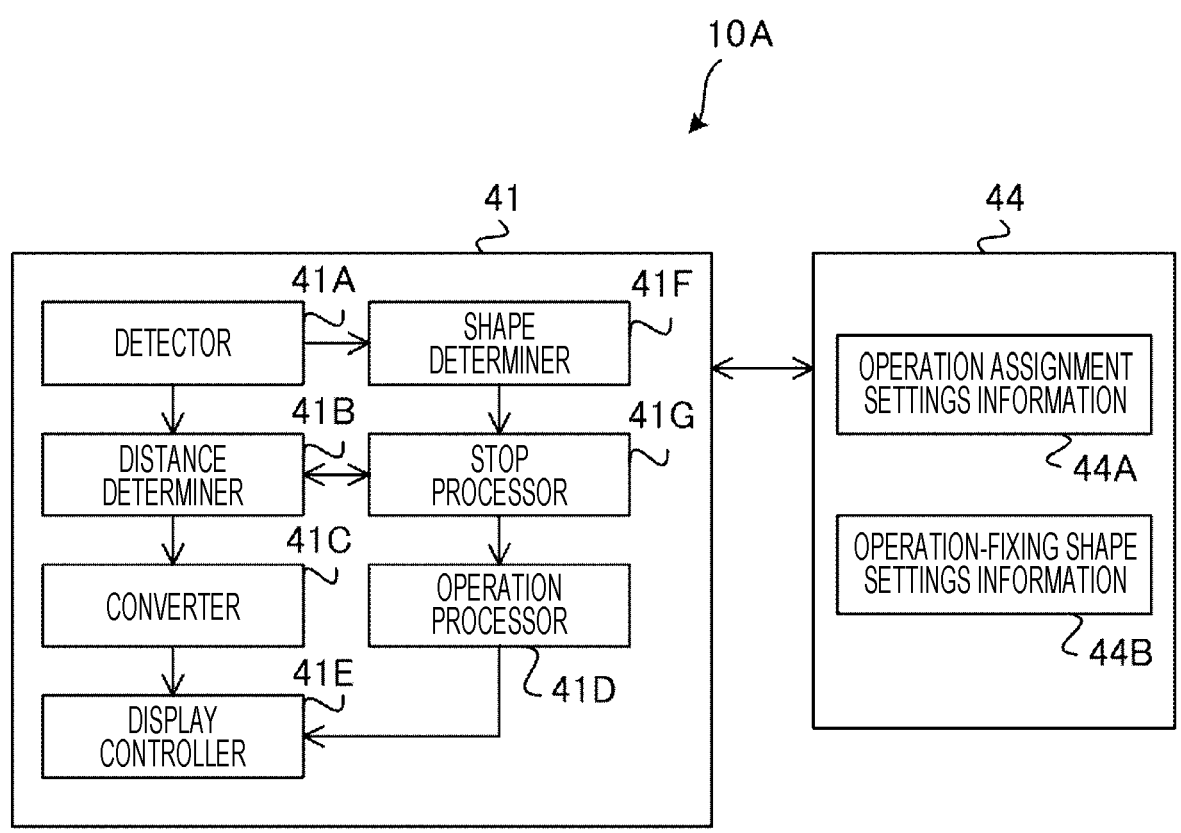
FIG. 19 is a block diagram illustrating an example functional configuration of an image processing apparatus according to a second exemplary embodiment.

In an image processing apparatus 10A according to this exemplary embodiment, the CPU 41 functions as the components illustrated in FIG. 19 by loading an information processing program stored in the ROM 43 into the RAM 42 and executing the information processing program.

FIG. 19 is a block diagram illustrating an example functional configuration of the image processing apparatus 10A according to the second exemplary embodiment.

As illustrated in FIG. 19, the CPU 41 of the image processing apparatus 10A according to this exemplary embodiment functions as the detector 41A, the distance determiner 41B, the converter 41C, the operation processor 41D, and the display controller 41E, and further functions as a shape determiner 41F and a stop processor 41G. Substantially the same components as those of the image processing apparatus 10 described above in the first exemplary embodiment are assigned the same reference symbols, and redundant descriptions thereof will be omitted.

The non-volatile memory 44 stores the operation assignment settings information 44A and operation-fixing shape settings information 44B.

The operation-fixing shape settings information 44B is information indicating the shape of the object to fix the operations corresponding to the regions R regardless of the regions R.

Figure 20:
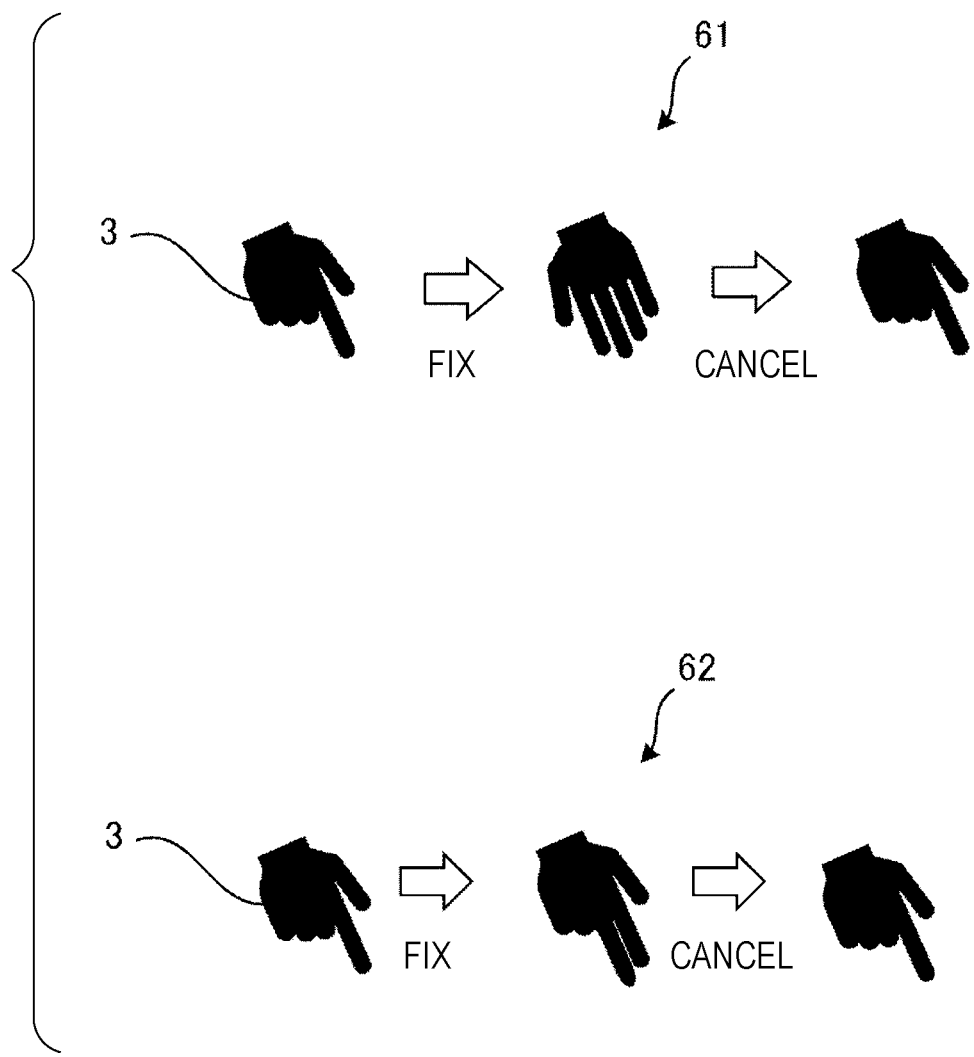
FIG. 20 is a diagram illustrating an example of operation-fixing shape settings information according to the second exemplary embodiment.

FIG. 20 is a diagram illustrating an example of the operation-fixing shape settings information 44B according to the second exemplary embodiment.

As illustrated in FIG. 20, the operation-fixing shape settings information 44B includes operation-fixing shape settings patterns 61 and 62. In the following description, the object is the hand 3 of the user, by way of example. In the operation-fixing shape settings pattern 61, the operation is fixed when the hand 3 of the user changes shape from "two fingers (extending the thumb and the forefinger)" to "five fingers (spreading out the five fingers, including the thumb, wide)". The fixing of the operation is canceled when the hand 3 of the user changes shape from "five fingers" to "two fingers". In the operation-fixing shape settings pattern 62, the operation is fixed when the hand 3 of the user changes shape from "two fingers (extending the thumb and the forefinger)" to "three fingers (extending the thumb and the first and second fingers)". The fixing of the operation is canceled when the hand 3 of the user changes shape from "three fingers" to "two fingers". The operation-fixing shape settings patterns 61 and 62 are examples, and any operation-fixing shape settings pattern can be set by the user as desired.

The shape determiner 41F determines the shape of the hand 3 of the user over the screen 30. The electrostatic capacitance to be detected on the screen 30 differs depending on the shape of the hand 3 of the user. The correspondence between the shape of the hand 3 of the user and the electrostatic capacitance is acquired in advance, which enables identification of the shape of the hand 3 of the user from the electrostatic capacitance detected in response to the user holding the hand 3 over the screen 30. The shape of the hand 3 of the user may be identified from an image captured by a camera.

In response to detection of a specific action with the hand 3 of the user within one of the plurality of regions R, the stop processor 41G fixes the operation to be performed to the operation assigned to the region where the specific action is detected, regardless of the distance between the screen 30 and the hand 3 of the user. In one example, the specific action is an action that changes the shape of the hand 3 of the user from a first shape (e.g., "two fingers") to a second shape (e.g., "five fingers"), as illustrated in the operation-fixing shape settings pattern 61 described above. In one example, in accordance with the operation-fixing shape settings pattern 61 described above, the stop processor 41G releases the fixing of the operation in response to detection of an action that changes the shape of the hand 3 of the user from the second shape back to the first shape after detection of the action that changes the shape of the hand 3 of the user from the first shape to the second shape.

Figure 21:
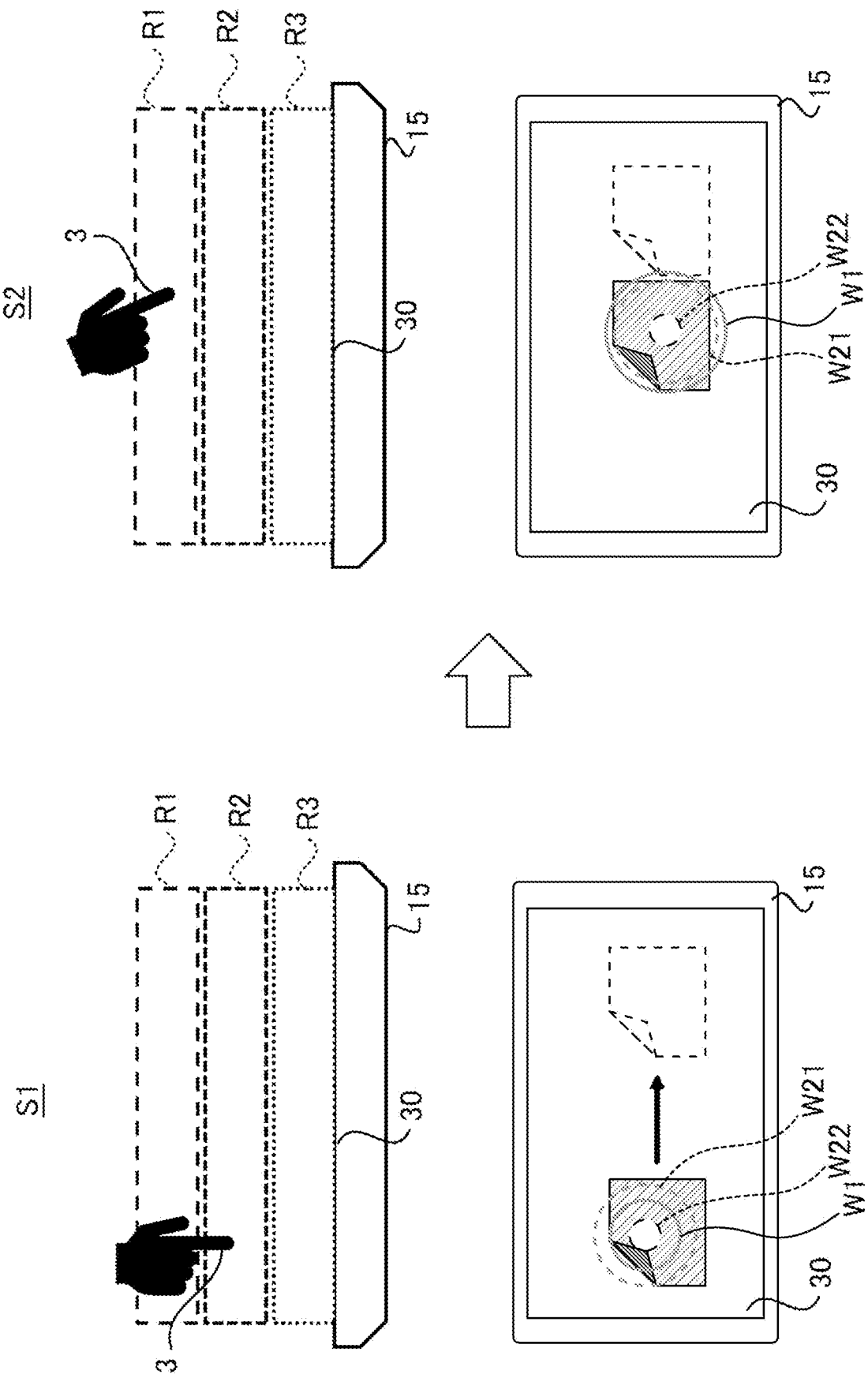
FIG. 21 is a diagram illustrating a screen transition in response to a movement of the user's hand according to a comparative example.

In the contactless operation, as presented in a comparative example illustrated in FIG. 21, it is difficult for the user to move the hand 3 while keeping it steady in the air without touching anything. In particular, dragging and flicking operations are more likely to be performed erroneously. Erroneous operations may be likely to occur if the space above the operation panel 15 is divided more finely than necessary.

FIG. 21 is a diagram illustrating a transition of the screen 30 in response to a movement of the hand 3 of the user according to a comparative example. In the example illustrated in FIG. 21, the first region R1 is assigned a "pointing operation", and the second region R2 is assigned a "dragging operation". In the example illustrated in FIG. 21, the second frame W23 corresponding to the third region R3 is not illustrated.

In FIG. 21, in S1, the hand 3 of the user is detected in the second region R2 out of the first region R1, the second region R2, and the third region R3. Then, in S2, in response to an unintentional movement of the hand 3 of the user to the first region R1, the "pointing operation" corresponding to the first region R1 is executed instead of the "dragging operation" corresponding to the second region R2.

FIG. 22 is a diagram illustrating an example of a transition of the screen 30 in response to a movement of the hand 3 of the user according to the second exemplary embodiment. In the example illustrated in FIG. 22, as in the example illustrated in FIG. 21, the first region R1 is assigned a "pointing operation", and the second region R2 is assigned a "dragging operation". In the example illustrated in FIG. 22, as in the example illustrated in FIG. 21, the second frame W23 corresponding to the third region R3 is not illustrated.

In FIG. 22, in S11, the hand 3 of the user is detected in the second region R2 out of the first region R1, the second region R2, and the third region R3. At this time, the user performs an action that changes the shape of the hand 3 from the first shape (e.g., "two fingers") to the second shape (e.g., "five fingers"). In response to the user changing the shape of the hand 3, the operation assigned to the second region R2 is fixed. Then, in S12, even if the user unintentionally moves the hand 3 to the first region R1, the "dragging operation" corresponding to the second region R2 is executed instead of the "pointing operation" corresponding to the first region R1.

In this exemplary embodiment, in response to a specific action with the hand 3 of the user within one of the regions R, update of the distance between the screen 30 and the hand 3 of the user is stopped, and the operation to be performed is fixed to the operation corresponding to the region R where the specific action is detected. Specifically, as in the example illustrated in FIG. 22, in response to the user changing the shape of the hand 3 from "two fingers" to "five fingers" within the second region R2, which is assigned the "dragging operation", the operation to be performed remains fixed to the "dragging operation" even if the user moves the hand 3 to the first region R1 during the dragging operation.

Next, the operation of the image processing apparatus 10A according to the second exemplary embodiment will be described with reference to FIG. 23.

Figure 23:
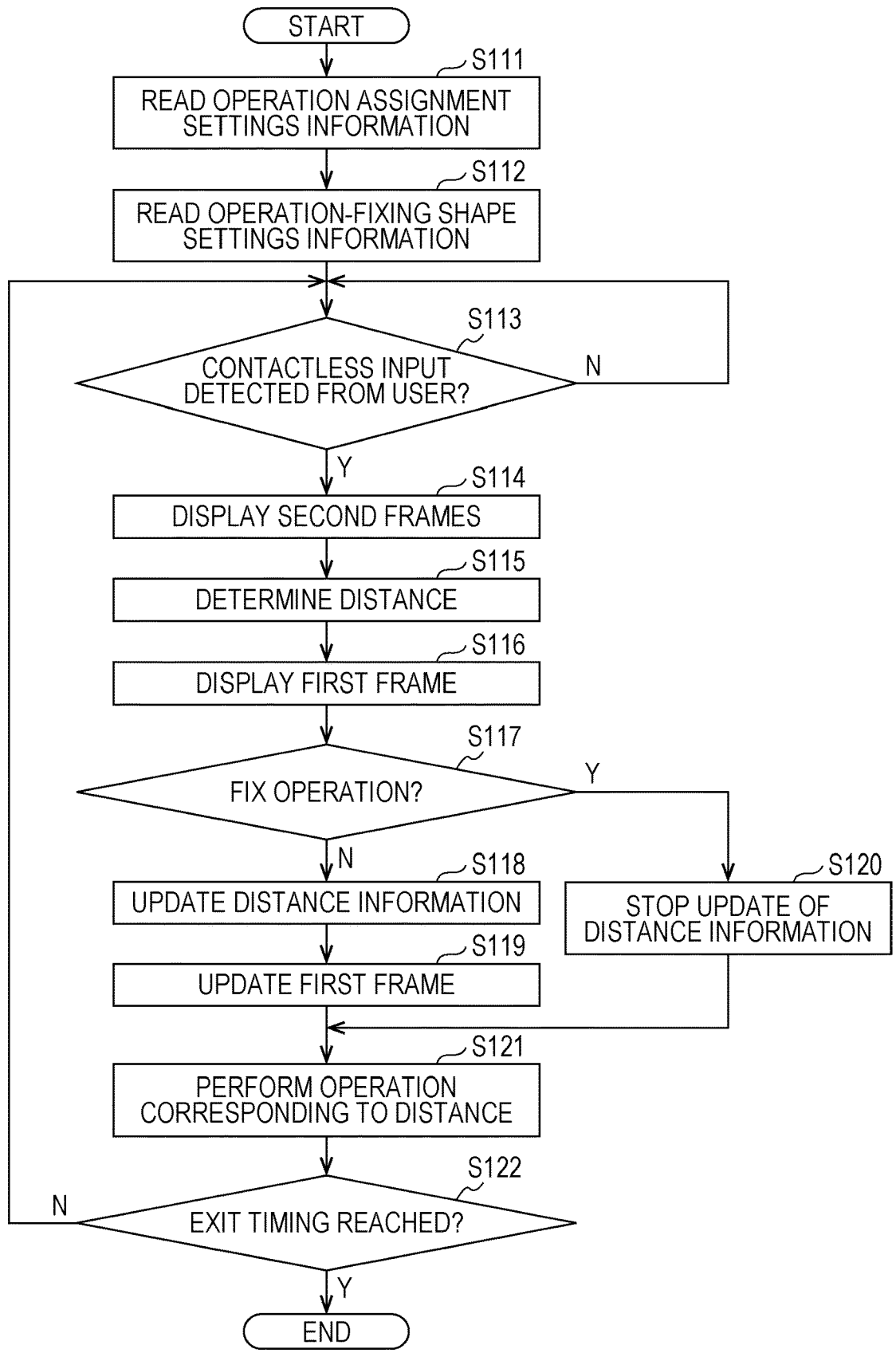
FIG. 23 is a flowchart illustrating an example of a process based on an information processing program according to the second exemplary embodiment.

FIG. 23 is a flowchart illustrating an example of a process based on an information processing program according to the second exemplary embodiment.

First, in response to an instruction to execute a contactless input through the operation panel 15, the CPU 41 activates the information processing program and executes the steps described below.

Referring to FIG. 23, in step S111, the CPU 41 reads the operation assignment settings information 44A from the non-volatile memory 44.

In step S112, the CPU 41 reads the operation-fixing shape settings information 44B from the non-volatile memory 44.

In step S113, the CPU 41 determines whether a contactless input from the user is detected. For example, if it is determined that the hand 3 of the user is detected as a contactless input from the user (if a positive determination is made), the process proceeds to step S114. If it is determined that the hand 3 of the user is not detected (if a negative determination is made), the process stands by in step S113.

In step S114, in one example, as illustrated in FIG. 22 described above, the CPU 41 performs control to display the plurality of second frames W2, which are centered on a position on the screen 30 corresponding to the detected position of the hand 3 of the user, on the screen 30 in association with the plurality of regions R, which are assigned in advance different operations to be performed in response to contactless operation.

In step S115, the CPU 41 determines the distance from the screen 30 to the hand 3 of the user.

In step S116, in one example, as illustrated in FIG. 22 described above, the CPU 41 performs control to display the first frame W1, which is centered on the position on the screen 30 corresponding to the detected position of the hand 3 of the user, in accordance with the distance determined in step S115. The timing of displaying the plurality of second frames W2 and the first frame W1 is not limited, and the plurality of second frames W2 and the first frame W1 may be displayed simultaneously.

In step S117, the CPU 41 determines whether to fix the operation, i.e., whether a specific action that changes the shape of the hand 3 of the user from the first shape (e.g., "two fingers") to the second shape (e.g., "five fingers") is detected. If it is determined that the specific action with the hand 3 of the user is not detected (if a negative determination is made), the process proceeds to step S118. If it is determined that the specific action with the hand 3 of the user is detected (if a positive determination is made), the process proceeds to step S120.

In step S118, the CPU 41 updates distance information indicating the distance from the screen 30 to the hand 3 of the user in accordance with a movement of the detected position of the hand 3 of the user.

In step S119, the CPU 41 updates the display of the first frame W1 on the screen 30 in accordance with the distance information updated in step S118. Then, the process proceeds to step S121.

On the other hand, in step S120, the CPU 41 stops the update of the distance information from the screen 30 to the hand 3 of the user. Then, the process proceeds to step S121.

In step S121, the CPU 41 performs an operation corresponding to the distance from the screen 30 to the hand 3 of the user. If the specific action with the hand 3 of the user is detected in step S117, in one example, as illustrated in FIG.

22 described above, the operation assigned to the distance (the region R) where the specific action is detected is executed.

In step S122, the CPU 41 determines whether the exit timing is reached. If it is determined that the exit timing is not reached (if a negative determination is made), the process returns to step S113, and the operations are repeatedly performed. If it is determined that the exit timing is reached (if a positive determination is made), the series of operations based on the information processing program ends. As used herein, the term "exit timing" refers to a timing at which the power is turned off or a timing at which the image processing apparatus 10A enters a sleep mode, for example.

In this exemplary embodiment, accordingly, in response to a specific action with an object within a region above a screen, update of the distance between the screen and the object is stopped, and the operation to be performed is fixed to an operation corresponding to the region where the specific action is detected. This may reduce the occurrence of erroneous operations in response to contactless operation being performed over the screen.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

An image processing apparatus has been described as an example of an information processing apparatus according to some exemplary embodiments. An exemplary embodiment may provide a program for causing a computer to execute the functions of the information processing apparatus. An exemplary embodiment may provide a non-transitory computer-readable storage medium storing such a program.

In addition, the configuration of the information processing apparatus described in each of the exemplary embodiments described above is an example, and may be modified depending on the situation without departing from the scope of the present disclosure.

The flow of the process based on the program described in each of the exemplary embodiments described above is also an example, and any unnecessary step may be deleted, a new step may be added, or the processing order may be changed without departing from the scope of the present disclosure.

In the exemplary embodiments described above, a program is executed to implement processes according to the exemplary embodiments by a software configuration using a computer, by way of example but not limitation. The exemplary embodiments may be implemented by, for example, a hardware configuration or a combination of a hardware configuration and a software configuration.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
a processor configured to:
cause a first frame to be displayed, in response to detection of an object performing contactless operation over a screen, in accordance with a distance between the screen and the object, the first frame being centered on a position on the screen corresponding to a position of the detected object; and
cause a plurality of second frames to be displayed in association with a plurality of regions, the plurality of second frames being centered on the position on the screen corresponding to the position of the detected object and having a different display form from the first frame, the plurality of regions being defined in accordance with a distance from the screen and being assigned in advance different operations to be performed in response to the contactless operation, the different operations corresponding to different types of actions that will execute based upon which region receives the operation.

2. The information processing apparatus according to claim 1, wherein the first frame is different from the plurality of second frames in at least one of line type or color.

3. The information processing apparatus according to claim 2, wherein the plurality of second frames are different from each other in at least one of line type or color in accordance with the plurality of regions associated with the plurality of second frames.

4. The information processing apparatus according to claim 3, wherein:
the first frame is displayed when the distance between the screen and the object is a first distance, and has a smaller size than a frame displayed when the distance between the screen and the object is a second distance longer than the first distance; and
the plurality of second frames have sizes such that a size of a second frame corresponding to a region closest to the screen among the plurality of regions is smallest and a size of a second frame corresponding to a region farthest from the screen among the plurality of regions is largest.

5. The information processing apparatus according to claim 4, wherein the first frame and the plurality of second frames are displayed concentrically around the position on the screen corresponding to the position of the detected object.

6. The information processing apparatus according to claim 3, wherein:
the first frame is displayed when the distance between the screen and the object is a first distance, and has a larger size than a frame displayed when the distance between the screen and the object is a second distance longer than the first distance; and
the plurality of second frames have sizes such that a size of a second frame corresponding to a region closest to the screen among the plurality of regions is largest and a size of a second frame corresponding to a region farthest from the screen among the plurality of regions is smallest.

7. The information processing apparatus according to claim 2, wherein:
the first frame is displayed when the distance between the screen and the object is a first distance, and has a smaller size than a frame displayed when the distance between the screen and the object is a second distance longer than the first distance; and
the plurality of second frames have sizes such that a size of a second frame corresponding to a region closest to the screen among the plurality of regions is smallest and a size of a second frame corresponding to a region farthest from the screen among the plurality of regions is largest.

8. The information processing apparatus according to claim 7, wherein the first frame and the plurality of second frames are displayed concentrically around the position on the screen corresponding to the position of the detected object.

9. The information processing apparatus according to claim 2, wherein:
the first frame is displayed when the distance between the screen and the object is a first distance, and has a larger size than a frame displayed when the distance between the screen and the object is a second distance longer than the first distance; and
the plurality of second frames have sizes such that a size of a second frame corresponding to a region closest to the screen among the plurality of regions is largest and a size of a second frame corresponding to a region farthest from the screen among the plurality of regions is smallest.

10. The information processing apparatus according to claim 1, wherein:
the first frame is displayed when the distance between the screen and the object is a first distance, and has a smaller size than a frame displayed when the distance between the screen and the object is a second distance longer than the first distance; and
the plurality of second frames have sizes such that a size of a second frame corresponding to a region closest to the screen among the plurality of regions is smallest and a size of a second frame corresponding to a region farthest from the screen among the plurality of regions is largest.

11. The information processing apparatus according to claim 10, wherein the first frame and the plurality of second frames are displayed concentrically around the position on the screen corresponding to the position of the detected object.

12. The information processing apparatus according to claim 1, wherein:
the first frame is displayed when the distance between the screen and the object is a first distance, and has a larger size than a frame displayed when the distance between the screen and the object is a second distance longer than the first distance; and
the plurality of second frames have sizes such that a size of a second frame corresponding to a region closest to the screen among the plurality of regions is largest and a size of a second frame corresponding to a region farthest from the screen among the plurality of regions is smallest.

13. The information processing apparatus according to claim 1, wherein an amount of movement of the first frame corresponding to the position of the detected object per unit time is smaller than an amount of movement of the object per unit time.

14. The information processing apparatus according to claim 1, wherein the processor is configured to issue a notification that the object is located near the screen in response to detection of the object being located in a region closest to the screen among the plurality of regions.

15. The information processing apparatus according to claim 1, wherein the processor is configured to, in response to detection of a specific action with the object within a region among the plurality of regions, fix an operation to be performed in response to the contactless operation to an operation assigned to the region where the specific action is detected, regardless of the distance between the screen and the object.

16. The information processing apparatus according to claim 15, wherein:
the specific action comprises an action that changes a shape of the object from a first shape to a second shape; and
the processor is configured to, after detection of an action that changes the shape of the object from the first shape to the second shape, release fixing of the operation in response to detection of an action that changes the shape of the object from the second shape back to the first shape.

17. The information processing apparatus according to claim 1, wherein the processor is configured to cause the plurality of second frames to be displayed such that text information indicating each of the operations assigned to the plurality of regions corresponding to the plurality of second frames is displayed.

18. The information processing apparatus according to claim 1, wherein the processor is configured to cause the plurality of second frames to be displayed such that text information indicating an operation assigned to a region where the object is detected among the plurality of regions corresponding to the plurality of second frames is selectively displayed.

19. A non-transitory computer readable medium storing a program causing a computer to execute a process for information processing, the process comprising:
displaying a first frame, in response to detection of an object performing contactless operation over a screen, in accordance with a distance between the screen and the object, the first frame being centered on a position on the screen corresponding to a position of the detected object; and
displaying a plurality of second frames in association with a plurality of regions, the plurality of second frames being centered on the position on the screen corresponding to the position of the detected object and having a different display form from the first frame, the plurality of regions being defined in accordance with a distance from the screen and being assigned in advance different operations to be performed in response to the contactless operation, the different operations corresponding to different types of actions that will execute based upon which region receives the operation.

20. An information processing method comprising:
displaying a first frame, in response to detection of an object performing contactless operation over a screen, in accordance with a distance between the screen and the object, the first frame being centered on a position on the screen corresponding to a position of the detected object; and displaying a plurality of second frames in association with a plurality of regions, the plurality of second frames being centered on the position on the screen corresponding to the position of the detected object and having a different display form from the first frame, the plurality of regions being defined in accordance with a distance from the screen and being assigned in advance different operations to be performed in response to the contactless operation, the different operations corresponding to different types of actions that will execute based upon which region receives the operation.

\* \* \* \* \*